United States Patent [19]
Stobbs et al.

[11] Patent Number: 5,069,420
[45] Date of Patent: Dec. 3, 1991

[54] PROPORTIONAL PRESSURE CONTROL VALVE

[75] Inventors: Thomas J. Stobbs, West Allis; Kishor J. Patel, Mukwonago, both of Wis.

[73] Assignee: Applied Power Inc., Butler, Wis.

[21] Appl. No.: 534,386

[22] Filed: Jun. 7, 1990

Related U.S. Application Data

[63] Continuation-in-part of Ser. No. 477,026, Feb. 8, 1990.

[51] Int. Cl.⁵ ............................................. F16K 31/40
[52] U.S. Cl. .............................. 251/30.02; 251/129.08; 137/454.5
[58] Field of Search ............... 251/30.01, 30.02, 129.08, 251/30.03; 137/625.64, 625.66, 454.5

[56] References Cited

U.S. PATENT DOCUMENTS

| | | |
|---|---|---|
| 2,190,461 | 6/1987 | Poyser . |
| 2,880,708 | 4/1959 | Hayner . |
| 3,286,734 | 11/1966 | Hartshorne . |
| 3,443,594 | 5/1969 | Frayer . |
| 3,856,047 | 12/1974 | Takayama . |
| 4,245,815 | 1/1981 | Willis . |
| 4,411,289 | 10/1983 | Walters ................. 251/129.08 X |
| 4,524,947 | 6/1985 | Barnes et al. . |
| 4,543,875 | 10/1985 | Imhof . |
| 4,576,200 | 3/1986 | Janecke et al. . |
| 4,585,030 | 4/1986 | Fox . |
| 4,590,968 | 5/1986 | Wolfges . |
| 4,605,197 | 8/1986 | Casey et al. . |
| 4,617,968 | 10/1986 | Hendrixon . |
| 4,623,118 | 11/1986 | Kumar ................. 251/129.08 X |
| 4,662,605 | 5/1987 | Garcia . |
| 4,676,273 | 6/1987 | Stoltman . |
| 4,682,675 | 7/1987 | Eddy, Jr. . |
| 4,749,069 | 6/1988 | Knecht et al. . |
| 4,767,097 | 8/1988 | Everett et al. . |
| 4,774,976 | 10/1988 | Janecke et al. . |
| 4,793,589 | 12/1988 | Eldredge et al. . |
| 4,835,503 | 5/1989 | Everett . |
| 4,854,429 | 8/1989 | Casey . |
| 4,875,499 | 10/1989 | Fox . |

FOREIGN PATENT DOCUMENTS

| | | |
|---|---|---|
| 58-156784 | 9/1983 | Japan . |
| 2102158 | 1/1983 | United Kingdom . |

Primary Examiner—Arnold Rosenthal
Attorney, Agent, or Firm—Quarles & Brady

[57] ABSTRACT

A two-stage, proportional pressure control valve is disclosed which may be used for uni-directional fluid flow. A poppet is movably positioned within a body of the valve. Pressure forces acting on the poppet affect the position of the poppet and thus the magnitude of fluid flow through the valve. A control pressure chamber is defined by the poppet and an orifice plate. The orifice plate includes an passage which may be blocked by an armature. An electromagnetic driver produces a magnetic flux path that is substantially proportional to a variable input current. The electromagnetic driver is operable to move the armature and thereby allow fluid in the control pressure chamber to exit through the passage. The proportional pressure control valve can be incorporated into a damper of a vehicle suspension system where the input current is governed by an electronic control unit of the vehicle. The electronic control unit may be responsive, in part, to the position of the suspension system through the use of a position feedback sensor.

7 Claims, 8 Drawing Sheets

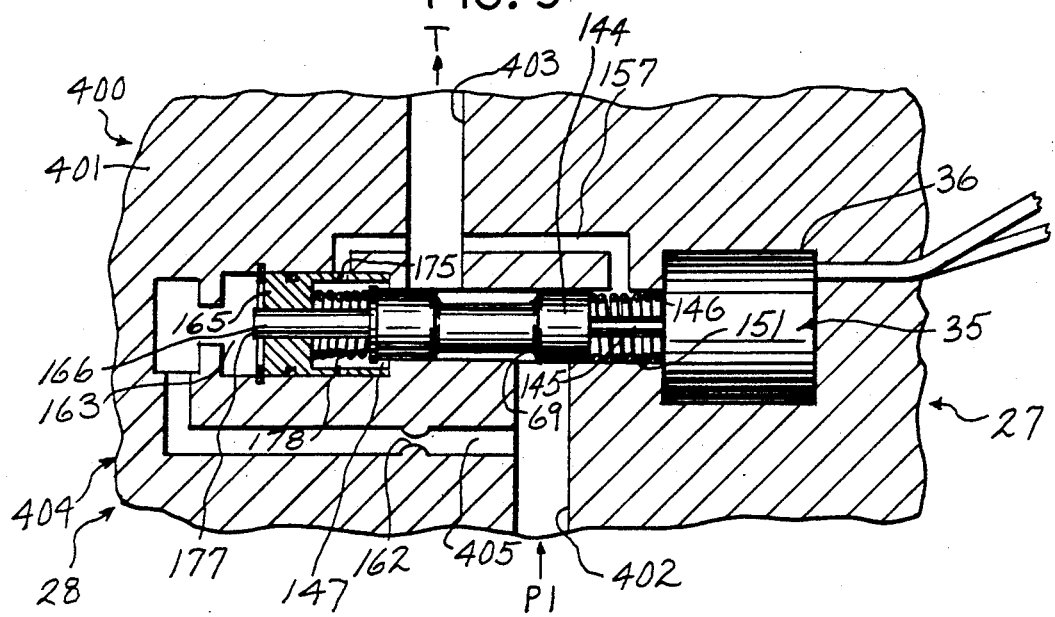
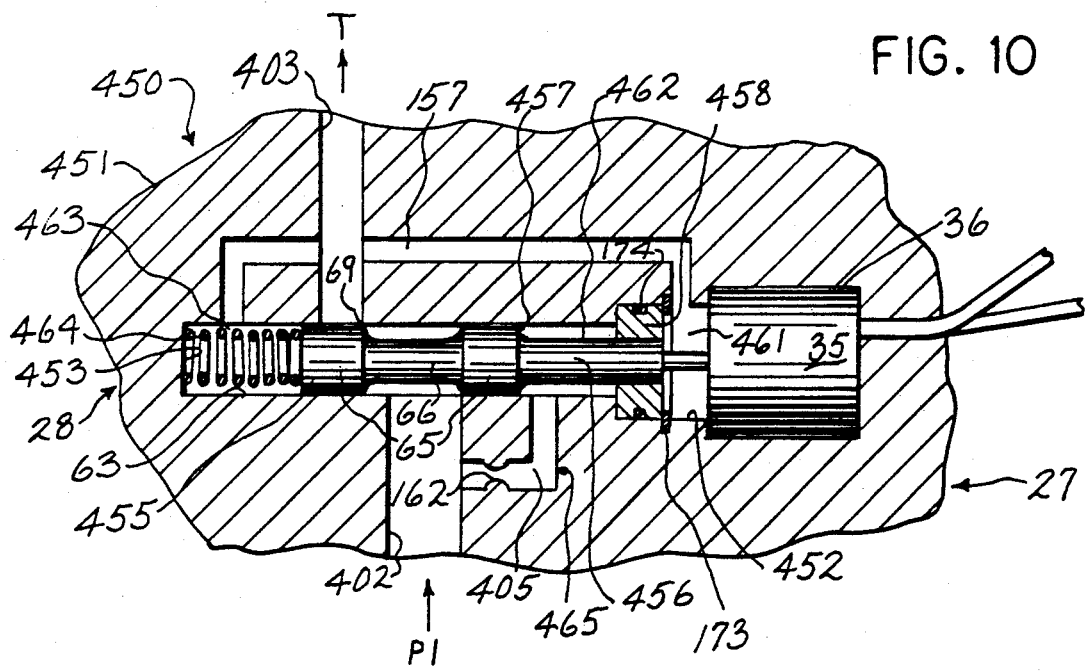

PROPORTIONAL PRESSURE CONTROL VALVE

FIELD OF THE INVENTION

This invention relates to pressure control devices, and more specifically, to a compact two-stage flow control valve having uni-directional fluid flow. The invention is especially useful in vehicle suspension systems in parallel with existing valving in a damper, although it may be used in a multitude of other systems employing hydraulic pressures. When combined with a damper, the electronic control unit of the vehicle can be used to provide an electronic input to a proportional driver of the device. The electronic input may be a function, in part, of the position of the damper.

BACKGROUND OF THE INVENTION

Hydraulic shock absorbers or suspension dampers are used on vehicles to dampen spring oscillations caused by uneven road surfaces or vehicle accelerations. Hydraulic dampers absorb energy released by the springs and use hydraulic principles to transfer the energy to oppose the force of the springs. Dampers employ a piston within a cylinder, where the damper extends and retracts (compresses) in response to vehicle movements. Fluid is forced through a series of orifices and relief and check valves in order to control the motion of the piston and achieve damping.

Unfortunately, however, such dampers are static in that the orifices and the relief and check valves employ fixed openings and operate with the same damping characteristics for every compression and extension. Dampers should optimally be able to assume different operating characteristics under varying operating conditions. To correct this shortcoming, vehicle suspension systems have incorporated selectable or adaptable control systems. In these systems, the vehicle operator is able to select between firm or soft suspension ride modes. A small direct current motor within the damper opens or closes a valve which operates in parallel with the standard orifices and relief valves within the damper. As a result, the vehicle operator may modify the vehicle ride mode to accommodate personal preference.

Selectable control is limited, however, because the parallel valving must be set in either a fully on or a fully off position. It would be desirable for the control system to be proportionally controlled, so that the characteristics of the damper could change in relation to the varying road conditions. It would also be desirable for the control system to incorporate other factors which may affect the optimal suspension ride mode, such as vehicle speed, load, or the present position of the damper. Additionally, selectable control systems require several seconds for the selected ride mode to take effect. Thus, even if the operator desired to modify the ride mode for an upcoming change in road conditions, the selectable system may not be able to respond in time.

It can therefore be seen that a need exists for an improved pressure control valve that will provide proportional pressure control and that can be operated by a control system which can incorporate multiple variable inputs.

SUMMARY OF THE INVENTION

The present invention is embodied within a proportional pressure control valve having a body with a poppet bore and an armature bore which are separated by a passage. The body has inlet and outlet ports that are in communication with the poppet bore. A conduit connects the armature bore and the outlet port. The valve also includes an electromagnetic driver having an armature that is movable within the armature bore. The armature is movable between a closed position, where the armature is positioned to prevent fluid flow through the passage, and an infinite number of flow positions, where the armature is positioned to permit fluid flow through the passage. An electromagnetic force source is associated with the armature and is operable to receive a variable input current and establish a magnetic flux path through the armature to move the same. The strength of the magnetic flux path is substantially proportional to the variable input current. A poppet of the valve has a main surface and an aperture extending through the main surface. The poppet is positioned within the poppet bore and is movable in an infinitely variable manner between a sealing position and an infinite number of open positions. The position of the poppet in the open position determines in part the magnitude of fluid flow through the valve. The valve also includes means for biasing the armature within the armature bore and means for biasing the poppet within the poppet bore.

This aspect of the invention provides a two-stage pressure control valve which is proportionally controlled. The proportionally-controlled valve can operate over a wide range of flow rates, while also functioning at reduced noise levels. The two-stage valve operates with a low level of fluid leakage.

In another aspect of the invention, the armature is biased toward the closed position and the electromagnetic force source is operable to move the armature into a flow position. Additionally, the poppet is biased toward the sealing position so that it is in contact with a valve seat. This aspect beneficially establishes a fail-safe condition where the valve is closed to fluid flow. When the valve is incorporated into a vehicle shock absorber, the shock will provide high levels of damping when the electromagnetic driver is not energized.

In another aspect, the valve also includes a sleeve that is formed of a non-magnetic material and is secured to the body. A solenoid cap is secured to the sleeve so that the armature is movably positioned inward of the sleeve and the solenoid cap. This aspect permits easy repair or replacement of the electromagnetic force source without breaking the fluid seal of the valve.

Thus, it is an object of the invention to provide a pressure control valve which will achieve proportional fluid restriction and operate at reduced noise levels.

It is another object of the invention to provide a proportional pressure control valve that can be operated as either a uni-directional fluid flow valve or a bi-directional fluid flow valve.

It is another object of the invention to provide a proportional pressure control valve that functions as a two-stage device in order to operate at large flow rates.

It is still another object of the invention to provide a proportional pressure control valve that can be constructed to operate in a fail-safe position where the valve is closed to fluid flow.

It is yet another object of the invention to provide a proportional pressure control valve that may be used as parallel valving within a vehicle damper to proportionally allow for continuous variable restriction with a given input current.

The foregoing and other objects and advantages of the present invention will appear from the following description. In the description, reference will be made to the accompanying drawings which illustrate preferred embodiments of the present invention. These embodiments do not represent the full scope of the invention. Reference should therefore be made to the claims herein for interpreting the full scope of the invention.

BRIEF DESCRIPTION OF THE DRAWINGS

FIG. 9 is a view partially in section showing a sixth embodiment of the invention;

FIG. 10 is a view partially in section showing a seventh embodiment of the invention;

DETAILED DESCRIPTION OF THE PREFERRED EMBODIMENTS

Figures 1, 5:
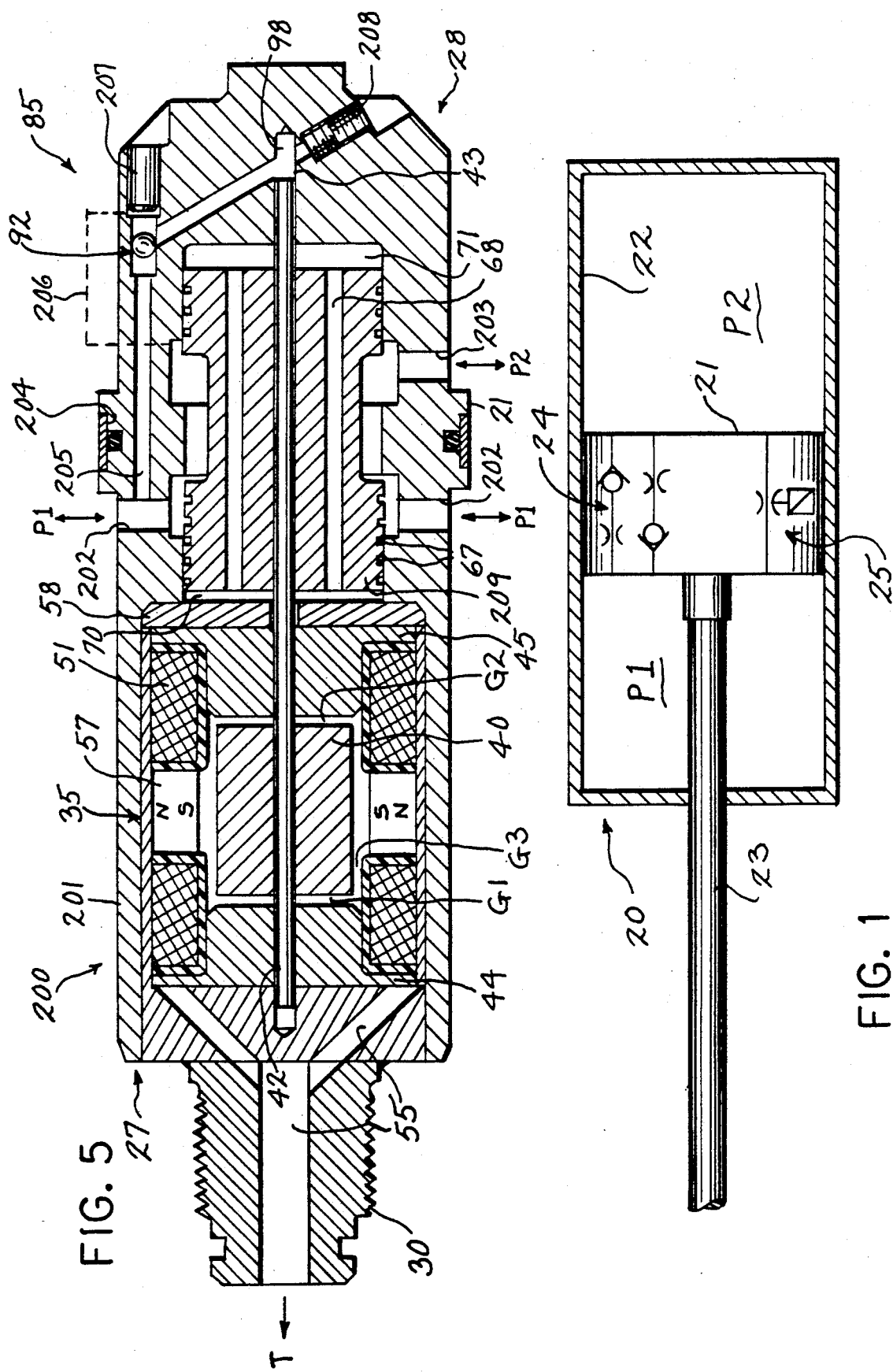
FIG. 1 is a view in section of a shock absorber for a vehicle that schematically incorporates a proportional pressure control valve embodying the invention.
FIG. 5 is a view in section showing a third embodiment of the invention.

Referring to FIG. 1, a shock absorber or suspension damper 20 generally has a piston 21 which is slidably mounted within a cylinder tube 22. A piston rod 23 is attached to the piston 21 and extends through an end of the cylinder tube 22. The piston 21 divides the cylinder tube 22 into work chambers containing fluid at variable pressures represented by the notation P1 and P2. As illustrated schematically, the piston 21 may house both known damping valves 24, consisting of check valves and restricted orifices, and an electrohydraulic pressure control valve 25 according to the present invention. The disclosed electrohydraulic pressure control valve 25 is shown in this description in combination with a damper 20, although the valve 25 may be combined with equipment other than a suspension damper or a strut. For example, the valve 25 can easily be adapted to be the pilot stage for the flow control, or be incorporated in an engine mount adaptive system control, a clutch control, a transmission control, a brake control, an hydraulic pump control, or an industrial relief valve for hydraulic pressure.

Figure 2:
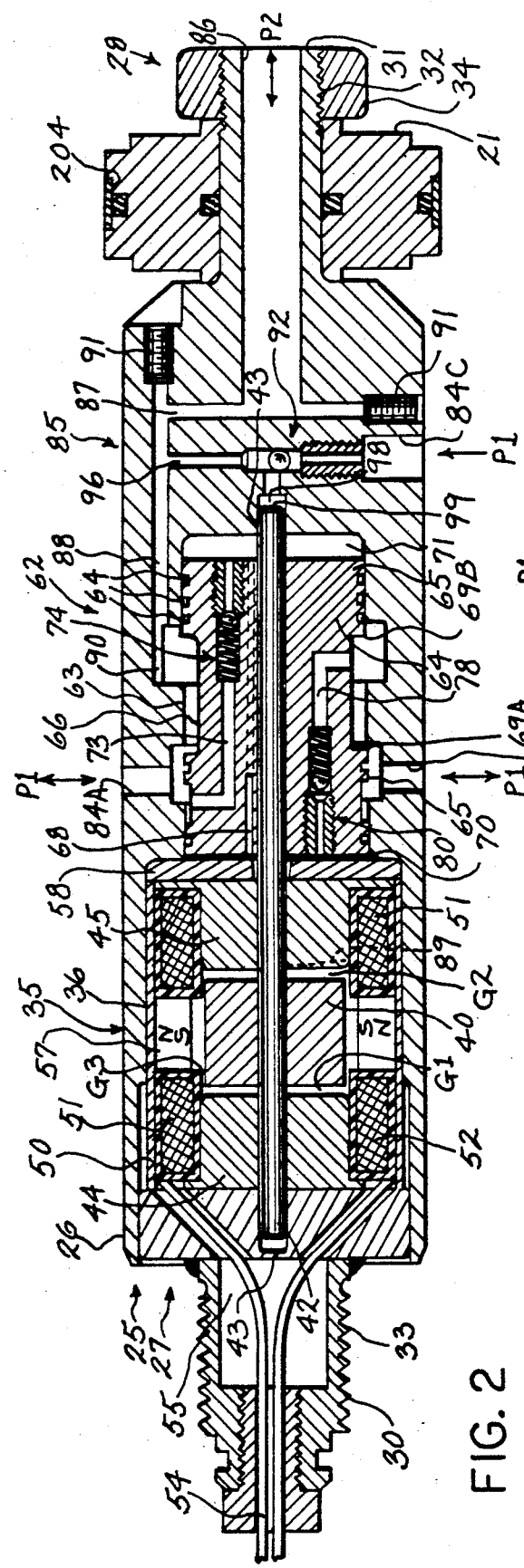
FIG. 2 is a view in section of the proportional pressure control valve of FIG. 1.

Referring to FIG. 2, the pressure control valve 25 is formed with an elongated housing 26 having a rod end 27 and an opposite base end 28. The rod end 27 of the housing 26 is open to receive a housing plug 30 that is secured by conventional means, such as welding. The base end 28 of the housing 26 has a nose 31 with external threads 32. This design allows the valve 25 to be incorporated within the damper 20. The piston rod 23 is secured to external threads 33 on the housing plug 30 (connection not shown). The piston 21 is mounted on the nose 31 and secured by a nut 34. The exterior of the piston 21 has a stepped area 204 to receive a sealing means.

An electromagnetic driver 35 is mounted within the housing 26 adjacent the rod end 27. The electromagnetic driver 35 is situated in a driver cavity 36 that is sealed by the housing plug 30. The electromagnetic driver 35 includes a cylindrically-shaped armature 40 which is axially movable within the cavity 36. The armature 40 is preferably made of a low magnetic reluctance, ferromagnetic material such as iron, and formed with a central bore to receive a plunger rod 42. The plunger rod 42 and armature 40 are press fitted or otherwise suitably fastened together and therefore move in concert. The plunger rod 42 can move axially within a plunger rod bore 43 that is formed partially in the housing 26 (base end 28) and partially in the housing plug 30. A small channel (not shown) connects the portion of the plunger rod bore 43 formed in the housing plug 30 to the area surrounding the armature 40 to prevent pressure from building in that portion of the plunger rod bore.

A rod pole face 44 and a base pole face 45 are mounted within the driver cavity 36 on opposite ends of the armature 40. The pole faces 44 and 45 are formed of steel or other material which will permit the passage of magnetic flux lines. Each pole face 44 and 45 has a central opening to accommodate the plunger rod 42 and allow fluid to pass between the plunger rod and the pole faces. The pole faces 44 and 45 are spaced apart from the armature 40 by gaps G1 and G2. The pole faces may halt axial movement of the armature 40 if the armature is displaced from its center position (shown in FIG. 2) by a distance greater than G1 or G2. Spacers (not shown) formed of a non-magnetic material may be mounted on the pole faces 44 and 45 to prevent actual contact between the pole faces and the armature 40, although the electromagnetic driver 35 is preferably not energized to a level that will allow the armature 40 and pole faces 44 and 45 to latch.

The electromagnetic driver 35 also includes a cylindrical coil retainer 50 which is positioned against the interior walls of the driver cavity 36. The coil retainer 50 is made of a low magnetic reluctance material. Coils 51, positioned radially inward of the coil retainer 50, are held in place by an annular bobbin 52 having a pair of window portions. The bobbin 52 is preferably formed of a plastic material such as glass-filled nylon. The bobbin 52 maintains the coils 51 concentric with the armature 40, and is spaced apart from the armature 40 by a gap G3. Electrical leads 54 are routed through channels 55 in the housing plug 30 to connect the electromagnetic driver 35 to a control unit 56 (FIG. 3) located external to the housing 26 and the damper 20. The electromagnetic driver 35 is a proportional force device, and is designed to produce force in both the extend and retract positions. The level of current supplied to the electromagnetic driver 35 is described below.

An annular permanent magnet 57 is positioned between the window portions of the bobbin 52 and radially inward of the coil retainer 50. The permanent magnet 57 is held concentric with the armature 40 and has a radial magnetization, as illustrated in FIG. 2. The permanent magnet produces a magnetic field which tends to maintain the armature in the centered position between the pole faces 44 and 45. When the armature 40 is displaced from center, the permanent magnet 57 will exert a force tending to draw the armature back to center.

The electromagnetic driver 35 also has an annular-shaped rod guide 58 that is positioned in the driver cavity 36. The rod guide 58 is positioned between the base pole face 45 and a shoulder formed in the housing 26. To accommodate the plunger rod 42, the rod guide 58 has a central opening in line with the central opening of the base pole face 45. The plunger rod 42 can move axially through the central opening of the rod guide 58. Also, fluid may pass through the central opening between opposite sides of the rod guide 58.

Toward the base end 28 of the electromagnetic driver 35, the valve 25 has a valving section 62 that includes a cylindrical main bore 63. A metering spool 64 is press fitted or otherwise suitably mounted on the plunger rod 42 to axially move therewith. The metering spool 64 includes two cylindrical land portions 65 that are sized to fit within the main bore 63. A recessed area 66 is located between the land portions 65, adjacent metering edges 69A and 69B. Balancing grooves 67 extend circumferentially around the land portions 65 of the metering spool 64. Fluid leakage between the main bore 63 and the metering spool 64 may accumulate in the balancing grooves 67 to aid in centering the spool within the main bore 63 and reducing friction forces which oppose axial movement of the spool.

The metering spool 64 also includes various passages for routing fluid through the spool. A pair of axial channels 68 (only one shown partially in phantom) allow fluid to pass between a first end chamber 70 and a second end chamber 71. The first end chamber 70 is located between the rod end 27 of the spool 64 and the rod guide 58, and the second end chamber 71 is located between the base end 28 of the spool 64 and an end wall of the main bore 63. The size of the end chambers 70 and 71 varies depending on the axial position of the metering spool 64. A first routing channel 73 extends between a land portion 65 of the metering spool 64 and the second end chamber 71. The first routing channel 73 includes a first check valve 74 formed with a spring, a ball and a hollow plug. The spring is positioned in an enlarged portion of the first routing channel 73 to lightly seat the ball against the plug. The hollow plug of the first check valve 74 is threadably inserted into the metering spool 64. A second routing channel 78 extends between the recessed area 66 and the first end chamber 70. The second routing channel 78 includes a similar second check valve 80 having a spring, a ball and a hollow plug.

The valving section 62 has several first inlet ports 84A, 84B and 84C that are open to a pressure source P1. All of the first inlet ports are positioned on the rod end side 27 of the piston 21. As shown in FIG. 2, two of the first inlet ports 84A and 84B extend from the main bore 63 through the housing 26. Other first inlet ports (not shown) may be spaced about the circumference of the housing 26 in axial alignment with first inlet ports 84A and 84B. Another first inlet port 84C extends through the housing 26 and is part of a force feedback section 85 of the valve 25.

The housing 26 also has a second inlet port 86 that is open to a pressure source P2 on the base end side 28 of the piston 21. The second inlet port 86 extends longitudinally through the nose 31 of the housing 26. Channels 87 and 88 connect the second inlet port 86 with an enlarged portion 90 of the housing 26 that is open to the main bore 63. Plugs 91 are used to seal the channels 87 and 88.

The force feedback section 85 of the valve 25 includes a shuttle valve 92 with a ball movably retained within a chamber by a hollow plug. The hollow plug provides a fluid connection between the shuttle valve chamber and pressure source P1 through the first inlet port 84C. Another channel 96 connects the shuttle valve chamber with pressure source P2 through the second inlet port 86 and channels 87 and 88. Fluid passing through the shuttle valve 92 enters a feedback chamber 98 that is defined by the portion of the plunger rod bore 43 and a lateral face 99 of the plunger rod 42.

In operation, the pressure control valve 25 may allow fluid communication between pressure sources P1 and P2, depending on the position of the metering spool 64. The metering spool may assume a closed position, where the land portions 65 substantially seal against the inside of the main bore 63 to prevent fluid communication between P1 and P2. Note that a relatively small amount of fluid may pass between the pressure ports P1 and P2 even in the closed position, due to fluid passing between the land portion 65 and the inside of the main bore 63. The metering spool 64 may also assume a fully open position, where the spool is positioned to allow maximum fluid flow between P1 and P2. Between the closed and fully open positions, the valve 25 may assume an infinite number of open positions, as the metering edges 69A and 69B move relative to the main bore 63. The magnitude of fluid flow through the valve 25 will depend on the fluid pressure and the specific position of the spool 64.

The pressure control valve 25 operates as a force summation device, whereby the position of the metering spool 64 is established by balancing various forces acting within the valve. The relationship of these forces is specified in the following equation:

$$\Sigma F_{Magnetic} = \Sigma F_{Feedback} + F_{Friction} + F_{Bernoulli} \qquad \text{Equation 1}$$

The magnetic forces are those forces acting on the armature 40 due to the permanent magnet 57 and due to energization of the coils 51. In the equation, a positive magnetic force is one tending to move the armature 40 toward the base end 28. Because the armature 40 and metering spool 64 are connected by the plunger rod 42, a positive magnetic force will thus also tend to move the spool toward the base end 28. The magnetic forces are generally opposed by a feedback force, a friction force, and a Bernoulli force. The feedback force results from pressure in the feedback chamber 98 acting on the lateral face 99 of the plunger rod 42. The feedback force tends to move the armature/plunger rod/metering spool configuration toward the rod end 27. The friction forces are those forces tending to resist any axial movement of the armature/plunger rod/metering spool configuration. The Bernoulli force is the fluid flow force acting on the metering spool 64 and tending to move the spool to close fluid flow between P1 and P2.

The feedback section 85 of the valve 25 establishes a feedback force equal to the higher pressure of P1 or P2 multiplied by the area of the lateral face 99 of the plunger rod 42. The pressure sources P1 and P2 are connected to opposite ends of the chamber of the shuttle valve 92. The shuttle valve ball seals against either channel 96 or the hollow plug of the shuttle valve 92, whichever contains the lower pressure. The shuttle valve 92 thereby opens the passage with the higher pressure to the feedback chamber 98. In this way, the higher pressure of P1 or P2 is routed to the feedback chamber 98 and becomes the feedback pressure which acts upon the lateral face 99 of the plunger rod 42. Movement of the plunger rod 42 is not opposed by fluid pressure in the plunger rod bore 43 formed in the housing plug 30 because of the previously mentioned channel (not shown) connected to that portion of the plunger rod bore 43.

The position of the metering spool 64 is not affected by fluid pressure within the first and second end chambers 70 and 71. Due to the axial channels 68 in the metering spool 64, the first and second end chambers 70 and 71 are in constant fluid communication and have the same pressure. Because the ends of the metering spool 64 have the same surface areas, the forces on the metering spool 64 from the first and second end chambers 70 and 71 are equal and opposite.

Additionally, the end chambers 70 and 71 are sealed from the higher pressure source P1 and P2 and open to the lower pressure source due to the arrangement of check valves 74 and 80 within the metering spool 64. The check valves 74 and 80 in FIG. 2 are illustrated as if P1 were greater than P2. In that case, the pressure of P1 would enter the first routing channel 73 through the first inlet port 84A. The pressure P1 would close the first check valve 74, causing the ball to seat against the hollow plug. Fluid from P1 would also flow from the first inlet ports 84A and 84B past the recessed area 66 and into the enlarged area 90. The fluid pressure would substantially drop to that of pressure source P2 as the fluid passes between the metering edge 69A and the main bore 63. Because the inlet to the second routing channel 78 is positioned in the enlarged area 90, the second routing channel 78 would not contain fluid at a pressure equal to P1. As a result, the second check valve 80 would close, seating the ball against the hollow plug, but only by the combined force of the spring and pressure P2. Fluid in the end chambers 70 and 71 may unseat the ball in the second check valve 80 and drain to the lower pressure source P2 when the pressure in the end chambers 70 and 71 is sufficient to overcome the combined force of the spring and the lower pressure P2. The force required to unseat the ball in the second check valve 80 would be less than that required to unseat the ball in the first check valve 74, which is held by the spring and the higher pressure source P1. The springs of the check valves 74 and 80 may be sized to provide minimal resistance to fluid exiting the end chambers 70 and 71. It will be apparent that the check valve 74 and 80 allow fluid in the end chambers 70 and 71 to drain through the first check valve 74 in a similar manner when P2 is greater than P1.

Fluid migrating along the plunger rod 42 into the driver cavity 36 will remain at relatively low pressure levels and can exit the driver cavity by the same route. Thus, if the fluid pressure in the driver cavity 36 exceeds that in the end chambers 70 and 71, the fluid will return to the first end chamber 70 and exit to the lower pressure source P1 or P2 through the appropriate check valve 74 or 80. The position of the armature 40 will not interrupt fluid flow to the first end chamber 70 due to channels 89 (only one shown in phantom) that extend radially outward on the surface of the base pole face 45 to provide a fluid path from the central opening of the base pole face 45 to the gap G3.

When no current is supplied to the coils 51, the only magnetic force acting on the armature 40 is that due to the permanent magnet 57. The force from the permanent magnet 57 tends to maintain the armature 40 in the centered position. If the armature 40 is displaced from its center position, the force of the permanent magnet 57 will tend to move the armature 40 back to the center position, regardless of whether current is supplied to the coils 51. The force due to the permanent magnet 57 is balanced with the other forces to determine the position of the metering spool 64.

The electromagnetic driver 35 may produce an electromagnetic force which affects the position of the armature/plunger rod/metering spool configuration. Current supplied to the coils 51 will establish a flux path tending to move the armature 40 in the direction of either the base end 28 or the rod end 27. A reverse-polarity current will establish an opposite flux path and tend to move the armature 40 in the opposite direction. The magnitude of the current will determine the strength of the flux path, and therefore the level of force tending to move the armature 40 from the centered position. Thus, the valve 25 is a proportionally-controlled device because the electromagnetic force exerted on the armature 40 is substantially proportional to the magnitude of input current. The proportional electromagnetic driver 35 allows the valve 25 to operate at reduced noise levels.

As shown in FIG. 2, the centered position of the armature 40 results in the metering spool 64 being positioned to allow fluid flow between P1 and P2 through the recessed area 66 of the metering spool 64. From this position, the feedback pressure applied at 99 will tend to force the metering spool 64 toward the rod end 27, thereby allowing greater flow between P1 and P2. Conversely, the Bernoulli force will tend to force the metering spool 64 toward the base end 28 to reduce flow between P1 and P2. The friction force will oppose any movement of the armature 40, plunger rod 42 or metering spool 64. The permanent magnet 57 will only exert a force on the armature 40 if the armature is displaced from the center position. The electromagnetic force generated by supplying a current to the coil 51, may be positive (tending to force the armature 40 in the direction of the base end 28) or negative (tending to force the armature 40 in the direction of the rod end 27) depending on the polarity of the current.

In the preferred mode of operating the valve 25 of FIG. 2, the metering spool 64 is designed to close only when it is moved toward the base end 28 of the housing 26. Also, the electromagnetic driver 35 is preferably operated by supplying only a single-direction variable-amperage current to the coils 51. The appropriate current will have a polarity tending to move the armature 40 toward the base end 28 of the housing 26. Thus, in the preferred mode of operation for the valve 25, the electromagnetic driver 35 is energizable with a uniform-polarity variable current which tends to move the armature/plunger rod/metering spool configuration toward the base end 28 of the housing 26. It should be understood that the valve 25 may be operated in an equally advantageous manner, however, by supplying the electromagnetic driver 35 with an opposite uniform-polarity current. Operation in this opposite manner would simply require re-orienting the metering spool 64 to close when moved toward the rod end 27 and re-routing of the feedback section 85 so that the feedback force moves the spool toward the base end 28.

To operate the pressure control valve 25 in combination with a damper 20 for a vehicle, the valve 25 is installed as described above with the piston rod 23 threadably attached to the housing plug 30 and the piston 21 mounted on the nose 31 of the housing 26. As shown in FIG. 1, P1 represents the pressure in the cylinder tube 22 on one side of the piston 21 and P2 represents the pressure in the cylinder tube 22 on the other side of the piston.

Figure 3:
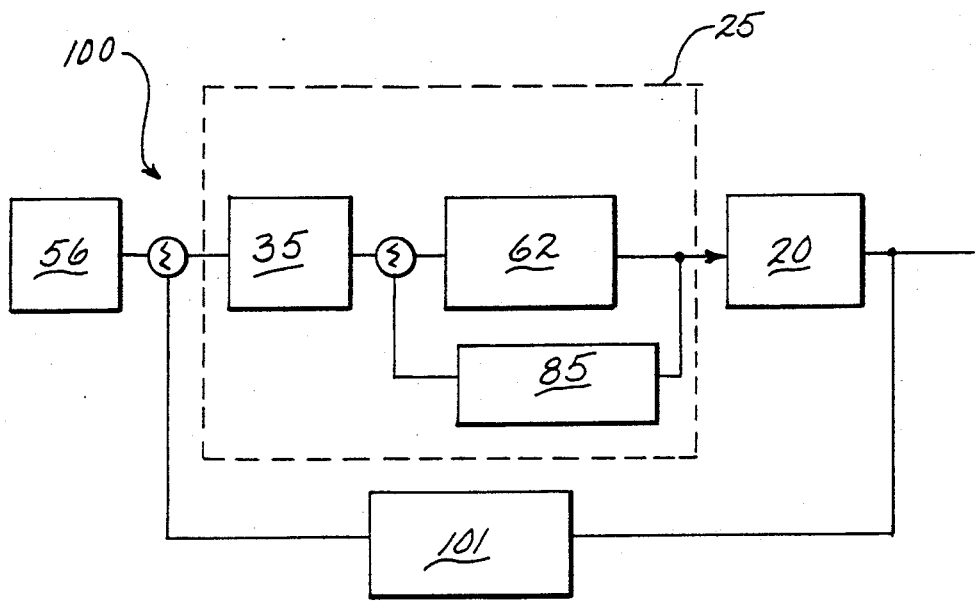
FIG. 3 is a schematic view of a control system for a vehicle suspension system that incorporates the proportional pressure control valve of FIG. 2.

A control system 100 for the valve 25 may be established as shown in the schematic diagram of FIG. 3. The valve 25 is illustrated as a dashed-line box which includes the electromagnetic driver 35, the valving section 62, and the force feedback section 85. The valving section 62 is responsive to the summation of forces from the electromagnetic driver 35 and the force feedback section 85 to control the fluid flow within the damper 20. Notably, the feedback force will be applied to the metering spool 64 in both the extend and retract modes of the damper 20. The control system 100 utilizes the electronic control unit (ECU) 56 of the vehicle. The ECU 56 governs the amount of electric current that is supplied to the electromagnetic driver 35. The ECU 56 can be programmed to supply the electromagnetic driver 35 with a current according to an algorithm which may incorporate multiple variables relating to the present operating condition of a vehicle, such as speed, load, and suspension extension. The output of the ECU 56 is either an analog or a digital control signal that is supplied to the electromagnetic driver 35. The preferred driving technique for the electromagnetic driver 35 is constant current modulation. This technique can be implemented by either linear or pulse-width modulated digital signals. An electronic valve driver (see 345 FIGS. 7 and 8) to generate such signals could easily be incorporated into either the electromagnetic driver 35 or the ECU 56.

Input to the ECU 56 regarding the extension of the vehicle's suspension system is provided by a position feedback sensor 101 mounted on the suspension system or within the damper 20 itself. The sensor 101 can be a linear or rotary sensor, for example, mounted in the strut. The sensor 101 provides the ECU 56 with an indication of the linear extension or compression of the damper 20.

The amount of fluid flow through the valve 25 will modify the firmness or softness of the vehicle's suspension. For example, when the valve 25 is closed so that it does not allow fluid communication between P1 and P2, all fluid flow between P1 and P2 will occur as a result of the known damping valves 24. This will provide a high degree of damping and a firm ride. A complete opening of the valve 25, on the other hand, will permit a rapid exchange of fluid from the higher pressure source to the lower pressure source. This results in a low degree of damping and a softer ride. Because the valve 25 is proportional, the electromagnetic driver 35 may be operated at any specified level to position the metering spool 64 in any position between the closed and fully open positions. Also, through the use of the ECU 56, the electromagnetic driver 35 may be operated at varying levels as a function of various operating characteristics of the vehicle.

Figure 6:
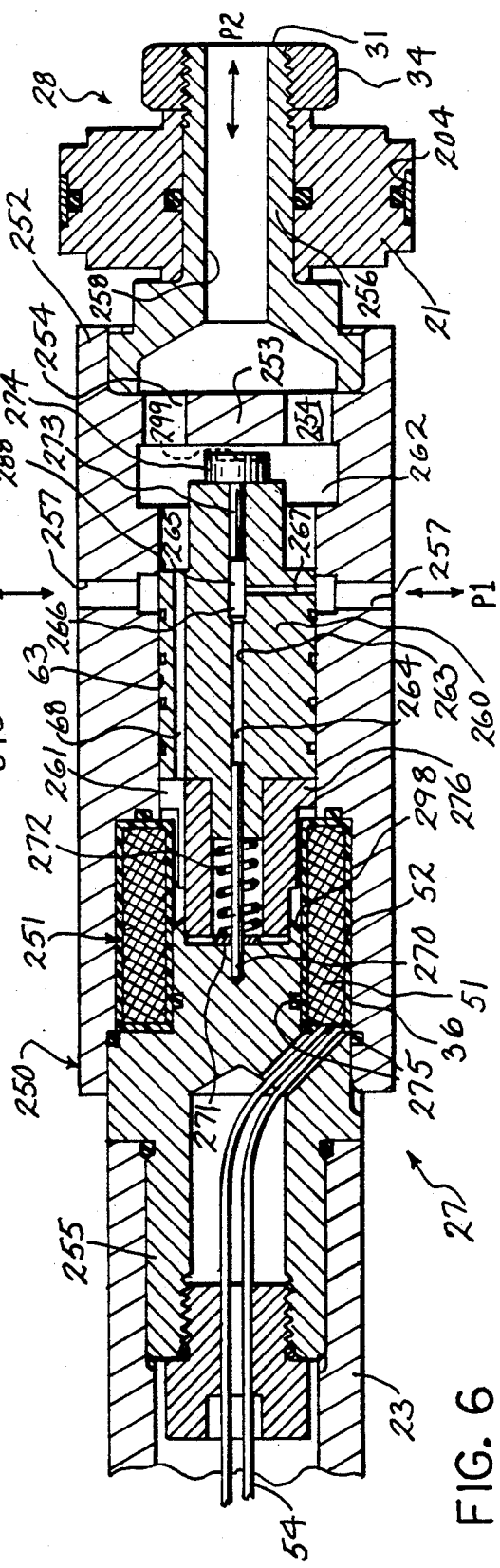
FIG. 6 is a view in section showing a fourth embodiment of the invention.
Figure 4:
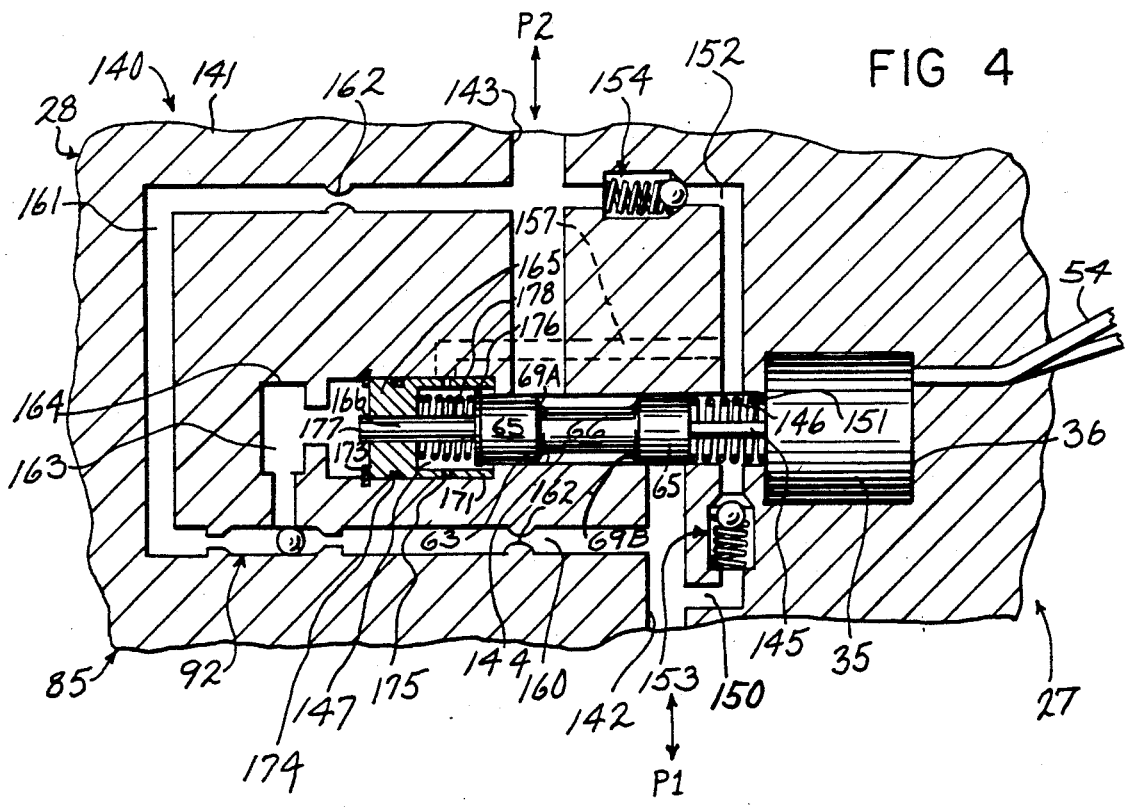
FIG. 4 is a view partially in section showing a second embodiment of the invention.

The valve 25 illustrated in FIG. 2 is designed for bi-directional fluid flow. Alternate embodiments of proportional pressure control valves embodying the invention and having bi-directional fluid flow are shown in FIGS. 4, 5 and 6. Throughout the description, features of one embodiment of the invention that are the same as those previously described in regard to another embodiment of the invention are labeled with the same reference numeral.

Viewing FIG. 4, a pressure control valve 140 has a housing 141 with a driver cavity 36 containing an electromagnetic driver 35 and having electrical leads 54 extending therefrom. The housing 141 has first and second inlet ports 142 and 143 in communication with a main bore 63 and connected to pressure sources P1 and P2. A metering spool 144 is slidably positioned within the main bore 63 and is connected to an armature 40 (not shown in FIG. 4) by a plunger rod 145. The metering spool 144 has land portions 65 with metering edges 69A and 69B surrounding a recessed area 66. Fluid may pass between the pressure sources P1 and P2 depending on the position of the metering spool 144.

The valve 140 has first and second end chambers 146 and 147 adjacent opposite ends of the metering spool 144. A first routing channel 150 connects P1 with the first end chamber 146. A first spring 151 is positioned in the first end chamber 146 between the rod end 27 of the metering spool 144 and the rod guide 58 (not shown in FIG. 4) of the electromagnetic driver 35. The first end chamber 146 is also in fluid communication with P2 through a second routing channel 152. The first and second routing channels 150 and 152 have first and second check valves 153 and 154, each including a ball and a spring. A passage 157 connects the second routing channel 152 with the second end chamber 147.

A feedback section 85 of the valve 140 has first and second passages 160 and 161 connecting the first and second inlet ports 142 and 143, respectively, with a shuttle valve 92. The first and second passages 160 and 161 have throttles 162 which dampen the fluid flow to prevent limit cycling caused by rapid changes in pressure. A ball in the shuttle valve 92 moves within a chamber to route the higher pressure P1 or P2 into a feedback chamber 163 defined by a widened bore section 164 of the housing 141, a guide member 165, and a feedback arm 166.

The guide member 165 is cylindrical with a main body portion having a central opening and with an annular skirt 171 extending axially away from the main body portion. The annular skirt 171 is positioned against a shoulder in the housing 141 formed between the widened bore 164 and the main bore 63. A snap ring 173 positioned in a groove in the widened bore 164 maintains the guide member 165 in place. An O-ring 174 provides a seal between the guide member 165 and the widened bore 164. The second end chamber 147 is defined by the space within the annular skirt 171 of the guide member 165. Radial holes 175 in the skirt 171 allow fluid in the second end chamber 147 to drain to the passage 157. The holes 175 are spaced about the perimeter of the skirt 171 in sufficient number so that one hole is always open to the passage 157.

The feedback arm 166 is generally cylindrical with an enlarged disc 176 at one end. The cylindrical portion of the feedback arm 166 is slidably positioned within the central opening of the guide member 165, with a lateral face 177 being positioned within the feedback chamber 163. A second spring 178 is loaded about the cylindrical portion of the of the feedback arm 166 and positioned between the guide member 165 and the disc 176. The second spring 178 maintains the feedback arm 166 in contact with the base end 28 of the metering spool 144. The diameter of the disc 176 is approximately the same as that of the metering spool 144.

The first and second springs 151 and 178 act in concert to center and affect the position of the armature/plunger rod/metering spool configuration. Depending on the pre-load settings of the springs 151 and 178, different operating characteristics and positions of the metering spool 144 may be achieved. The springs 151 and 178 will tend to bias the metering spool 144 to a fail-safe position, the position of the metering spool with no feedback pressure acting on the spool and no current supplied to the electromagnetic driver 35. In FIG. 4 for instance, the metering spool 144 is shown in a position to prevent fluid communication between P1 and P2. Thus, the fail-safe position of the metering spool 144 may be a valve closed condition. With different size springs 151 and 178, of course, the fail-safe position could be a valve open condition. In establishing the fail-safe position of the metering spool 144, the length of the plunger rod 145 may also have to be adjusted so that the armature 40 is centered within the electromagnetic driver 35.

The first and second end chambers 146 and 147 may contain fluid that has leaked from the main bore 63 past the land portions 65 or from the feedback chamber 163 past the guide member 165. The valve 140 is designed to allow the fluid in the end chambers 146 and 147 to drain to the lower pressure source P1 or P2. The check valves 153 and 154 prevent the high pressure fluid from entering the end chambers 146 and 147, while allowing fluid in the end chambers to drain to the lower pressure source. For example, if pressure P2 were greater than P1, the higher pressure P2 would seat the ball in the second check valve 154 as shown in FIG. 4. The ball in the first check valve 153 would be seated due to the force of the spring and of the lower pressure P1. Fluid in the first and second end chambers 146 and 147 would then drain to the lower pressure source through the first routing channel 150 when the pressure within the end chambers was sufficient to overcome the force of the spring and the lower pressure P1 acting to seat the ball in the first check valve 153. This situation is illustrated in FIG. 4, where the ball of the first check valve 153 is shown positioned to permit fluid from the first and second end chambers 146 and 147 to drain to the lower pressure source P1. The check valves 153 and 154 allow fluid flow in the opposite direction when pressure P1 is greater than P2.

The position of the metering spool 144 during operation of the valve 140 is established by the summation of forces acting on the armature/plunger rod/metering spool configuration. The electomagnetic driver 35 acts upon the armature 40 in the same as previously described in relation to the embodiment of the invention shown in FIG. 2. The forces resulting from energization of the coils 51 may tend to move the armature 40 in either direction depending on the polarity of the current supplied. In a preferred mode of operation, however, a single-polarity current is supplied to the coils 51 in order to move the armature 40, and thus the metering spool 144, toward the base end 28. The Bernoulli and friction forces also act in the same manner as previously described.

The feedback force tends to move the metering spool 144 in the direction of the rod end 27. The feedback force is equal to the fluid pressure in the feedback chamber 163 multiplied by the area of the lateral face 177 of the feedback arm 166. The feedback force is applied directly to the feedback arm 166, but is translated to the metering spool 144 because the second spring 178 maintains the feedback arm 166 in contact with the metering spool 144. The throttles 162 and the shuttle valve 92 tend to minimize the effect in the feedback chamber 163 of rapid fluctuations in pressure in either P1 or P2 and tend to prevent limit cycling. In combination with this, the first and second springs 151 and 178 also tend to minimize oscillation of the metering spool 144 due to rapid fluctuations in pressure.

In addition to the forces included in Equation 1 above, the embodiment of the invention shown in FIG. 4 would also include a force resulting from the combined effect of the first and second springs 151 and 178. The exact forces produced by the springs will depend on the particular size of spring, and it is contemplated that a variety of sizes and types of springs may be employed with this valve 140. In general, however, the first and second springs 151 and 178 produce a resultant force that acts in a similar manner as the force imparted on the armature 40 by the permanent magnet 57. The force of the springs 151 and 178 will counteract each other when the metering spool 144 is centered in the fail-safe position. As the metering spool 144 is displaced from center, however, the resultant force of the springs 151 and 178 will tend to move the metering spool 144 back toward the center position.

A further embodiment of the invention having bi-directional fluid flow is a pressure control valve 200 as shown in FIG. 5. The valve 200 employs an external low pressure source that is in communication with the first and second end chambers 70 and 71. This embodiment of the valve 200 also illustrates an alternate placement for the piston 21. A housing 201 for the valve 200 includes first inlet ports 202 that are open to pressure source P1 and a second inlet port 203 that is open to pressure source P2. The first inlet port 202 is positioned on the rod end 27 of a stepped area 204, while the second port 203 is positioned on the base end 28 of the stepped area. A sealing means can be positioned in the stepped area 204 to form the piston 21. The pressure sources P1 and P2 may communicate with one another through the valve 200 depending on the position of a metering spool 209.

A force feedback section 85 of the valve 200 has first and second passages 205 and 206 that connect the first and second inlet ports 202 and 203 with a shuttle valve 92. The second passage 206 is not seen in FIG. 5, but is instead represented schematically by a dashed line. The shuttle valve 92 has a ball that moves within a chamber and is retained within the chamber by a plug 207. The shuttle valve 92 is connected to a feedback chamber 98 which is defined by a portion of the plunger rod bore 43 that is formed in the housing 201. The feedback chamber 98 is sealed by another plug 208.

Fluid within the first and second end chambers 70 and 71 may drain to a low pressure reservoir or Tank T located external to the valve 200. Axial channels 68 within the metering spool 209 allow fluid communication between the end chambers 70 and 71. The electromagnetic driver 35 of the valve 200 is the same as that described with regard to FIG. 2. Thus, fluid from the first end chamber 70 may enter the gaps G1, G2 and G3 surrounding the armature 40 through the central opening in the rod guide 58 and the central opening in the base pole face 45. In this embodiment, the channels 55 in the housing plug 30 are connected to the Tank T. The electrical leads (not shown in FIG. 5) would then be routed to a control unit 56 through another conduit (not shown) within the housing plug 30. The channels 55 are also in fluid communication (connection past the rod pole face 44 not shown) with the gaps G1, G2 and G3 surrounding the armature 40. In this way, fluid which leaks into the end chambers 70 and 71, either from the inlet ports 202 and 203 past the balancing grooves 67 or from the feedback chamber 98 along the plunger rod 42, may drain past the armature 40 and to the external Tank T.

The valve 200 operates according to Equation 1, where the magnetic forces are those due to the permanent magnet 57 and due to energization of the coils 51. The metering spool/plunger rod/armature configuration is arranged so that the valve 200 provides fluid communication between P1 and P2 in the fail-safe position. Also, the metering spool 209 is positioned so that the valve 200 will close only by moving the spool toward the base end 28. With this arrangement, the electromagnetic driver 35 may be operated with a single-polarity variable current to move the metering spool 209 toward the base end 28. The resulting electromagnetic force will oppose the feedback force, which tends to move the metering spool 209 toward the rod end 27.

In FIG. 6, an alternate embodiment of the invention is shown in a valve 250 having bi-directional fluid flow and incorporating a uni-directional electromagnetic driver 251. A housing 252 for the valve 250 has a driver cavity 36, a main bore 63 and a wall 253 with apertures 254. A housing plug 255, formed of steel or other material which will permit the passage of magnetic flux lines, seals the electromagnetic driver 251 within the driver cavity 36. The valve 250 may be connected to a damper 20 (FIG. 1) by securing the piston rod 23 by conventional means to the housing plug 255. A base plug 256 is threadably attached to the base end 28 of the housing 252 by conventional means. Alternatively, the base plug 256 may be integrally formed with the housing 252. A piston 21 may be mounted on a nose 31 portion and secured by a nut 34. The housing 252 has first inlet ports 257 which allow fluid communication between the main bore 63 and pressure source P1. A second inlet port 258 in the base plug 256 allows the main bore 63 to communicate with pressure source P2 through the apertures 254.

A metering spool 260 is movably positioned within the main bore 63 to control fluid flow between P1 and P2. Axial channels 68 permit fluid flow between a first chamber 261 and a second chamber 262. The metering spool 260 has a central bore 263 with a reduced diameter 264 adjacent the rod end 27 and an enlarged diameter 265 adjacent the base end 28. The change in diameter creates an unbalanced area 266 within the central bore 263. The cross-sectional area of the enlarged diameter 265 is preferably at least twice as large as that of the reduced diameter 264. The surface area of the unbalanced area 266 is thus equivalent to the difference in cross-sectional areas between the enlarged and reduced diameters 265 and 264. A passage 267 extends radially outward from the enlarged diameter 265 portion in axial alignment with a first inlet port 257.

The metering spool 260 is slidably mounted on a centering pin 270 that is press fitted or otherwise suitably attached to the housing plug 255. A washer 271 is press fitted around the centering pin 270 against the housing plug 255. A spring 272 is loaded between the washer 271 and the metering spool 260 to bias the spool into the position illustrated in FIG. 6. The pin 270 and washer 271 are formed of non-magnet material for improved electromagnetic efficiency.

A feedback pin 273 is slidably mounted within the enlarged diameter portion 265 of the central bore 263. A radial protrusion 274 of the feedback pin 273 prevents the feedback pin 273 from fully entering the central bore 263. The radial protrusions 274 may contact the wall 253 and thereby limit axial movement of the pin 273 toward the base end 28. To allow for proper movement of the metering spool 260 as described below, the radial protrusion 274 includes a groove 299 that allows fluid from the second chamber 262 to flow between the wall 253 and the protrusion when a portion of the protrusion is in contact with the wall.

The uni-directional electromagnetic driver 251 includes a coil 51 within a bobbin 52. A pair of O-rings 275 positioned adjacent the bobbin 52 limit fluid flow from the first chamber 261 toward the connection between the housing plug 255 and the housing 252. An armature 276 of the electromagnetic driver 251 is press fit or otherwise suitably mounted on the metering spool 260 to move therewith. When current is supplied to the coil 51 by electrical leads 54, a flux path is established through the housing plug 255, the coil, and the armature 276, which tends to move the armature in the direction of the housing plug. Note that the housing plug 255 is formed with an annular projection 298 having a tapered edge. The projection 298 is positioned against the bobbin 52 and adjacent the armature 276 to minimize the flux leakage. Other shapes of projections as commonly known and used in the art may be substituted to produce efficient proportional operation of the electromagnetic driver 251.

The position of the metering spool 260 is established by a summation of forces according to the following equation:

$$\Sigma F_{Magnetic} + F_{Feedback} = \Sigma F_{Spring} + F_{Friction} + F_{Bernoulli}$$

Equation 2

A magnetic force occurs upon energization of the coil 51 and tends to move the armature 276 and metering spool 260 toward the housing plug 255. The spring force acts in an opposite direction, tending to move the metering spool 260 toward the base end 28. Thus, while the spring 272 biases the armature 276 away from the housing plug 255, the electromagnetic driver 251 is energizable to produce a flux path tending to pull the armature toward the housing plug. The friction and Bernoulli forces act in the same manner as previously described.

The feedback force tends to move the metering spool 260 toward the housing plug 255 no matter which pressure source P1 or P2 has a higher pressure. In the instances where pressure P1 is greater than P2, pressure P1 enters the central bore 263 of the metering spool 260 through the first inlet port 257 and the passage 267. The pressure P1 causes the feedback pin 273 to move toward the base end 28 until the radial protrusion 274 contacts the wall 253 (assuming P2 does not remain sufficiently large to maintain the feedback pin 273 within the central bore 263). The pressure P1 acts on the unbalanced area 266 which tends to move the metering spool 260 toward the rod end 27. When the metering spool 260 moves a sufficient distance toward the rod end 27, fluid may flow from the first inlet ports 257, past a metering edge 288, into the second chamber 262, and to pressure source P2. Note that the metering spool 260 may operate in an infinite number of open positions depending on the distance of the metering edge 288 from the edge of the first inlet ports 257.

Conversely, when pressure P2 is greater than P1, pressure P2 fills the first and second chambers 261 and 262 by virtue of the second inlet port 258 and the axial channels 68. The higher pressure P2 causes the feedback pin 273 to insert into the enlarged diameter 265 until the protrusion 274 contacts the metering spool 260. When the pin 273 is still against the wall 253, fluid enters the groove 299 in the radial protrusion 274 and forces the protrusion away from the wall 253. The fluid may then act on the full base end 28 surface of the radial protrusion 274 to move the feedback pin 273 against the metering spool 260.

With the feedback pin 273 spaced from the wall 253 and against the metering spool 260, the force from the second chamber 262 tending to move the spool 260 toward the rod end 27 will be greater than the force from the first chamber 261 tending to move the spool 260 toward the base end 28 due to a difference in surface areas. The net feedback force will be equal to the higher pressure P2 multiplied by the cross-sectional area of the centering pin 270 (i.e., the difference in surface areas). Thus, the resultant feedback force will tend to move the metering spool 260 toward the rod end 27 and tend to open fluid flow from the second chamber 262 to the first inlet ports 257.

Figure 7:
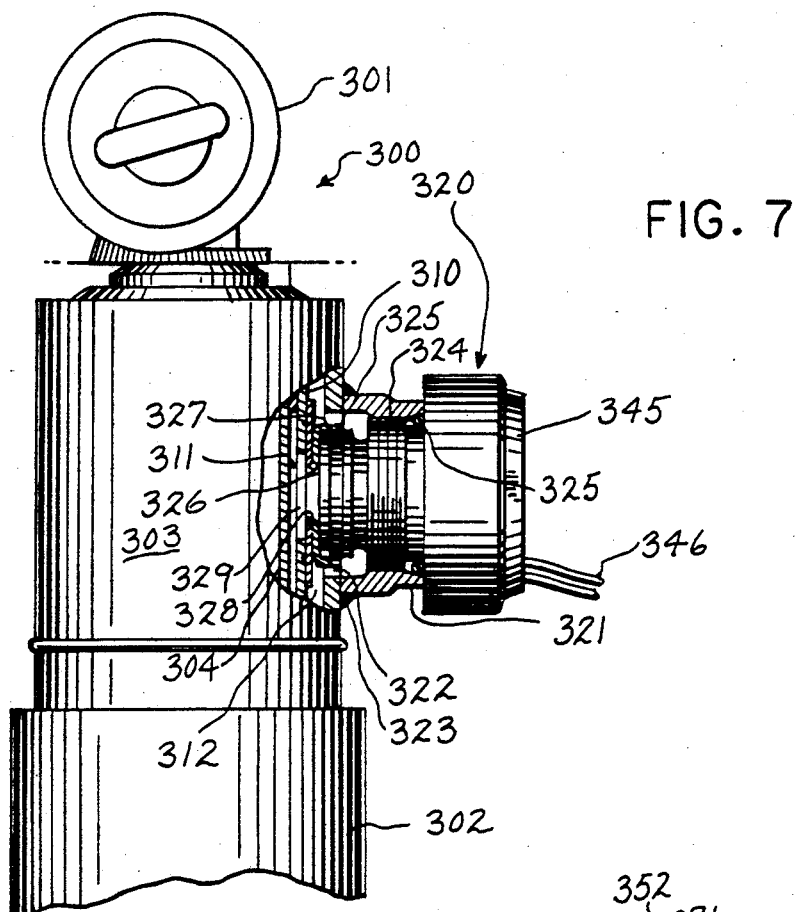
FIG. 7 is a view in elevation of another form of vehicle shock absorber incorporating a fifth embodiment of the invention, with portions broken away for the purpose of illustration.

The present invention may also be used in combination with a multi-tube type shock absorber or damper 300 as shown in FIG. 7. The damper 300 can be mounted at a lower mounting end 301 to a vehicle axle. A piston rod (not shown) extends through an opposite end of the damper 300 and may be connected to the vehicle body. A dust tube 302 mounted on the piston rod conceals a portion of a reservoir tube 303 and minimizes exposure of the piston rod to foreign substances when the damper 300 is extended.

The multi-tube damper 300 includes a cylinder tube 304 that houses a piston (not shown). The piston is mounted on the piston rod and divides the cylinder tube 304 into upper and lower work chambers. A wall section 310 between the cylinder tube 304 and the reservoir tube 303 forms a bypass chamber 311 and an equalization chamber 312. As is well known in the art, fluid in present multi-tube shock absorbers (not shown) may pass between the work chambers and the equalization chamber through various valves (not shown) located in the piston and at the ends of the cylinder tube. Fluid may also pass into the bypass chamber from one of the working chambers. In the damper 300 of FIG. 7, however, a uni-directional valve 320 according to the invention may be used to control the flow of fluid from the bypass chamber 311 to the equalization chamber 312. An electronic valve driver 345 having electrical leads 346 is mounted directly on the valve 320 to generate input signals to the valve.

The valve 320 is mounted on the damper 300 as shown in FIG. 7. A cylindrical guide 321 is positioned over an opening 322 in the reservoir tube 303. The guide 321 is contoured to match the exterior of the reservoir tube 303 and is fastened to the tube by welds 323. The valve 320 includes external threads 324 which engage internal mating threads on the guide 321, although similar means of connection such as a snap fit would be suitable as well. O-rings 325 prevents fluid leakage between the guide 321 and the valve 320 and between the bypass chamber 311 and the equalization chamber 312. A nose 326 of the valve 320 fits within a receiving bracket 327 to form a seal therebetween. The receiving bracket 327 includes a flared central opening 328 which resides within an aperture 329 of the wall section 310. By connecting the valve 320 in this manner, fluid from the bypass chamber 311 is in communication with the nose 326 of the valve.

Figure 8:
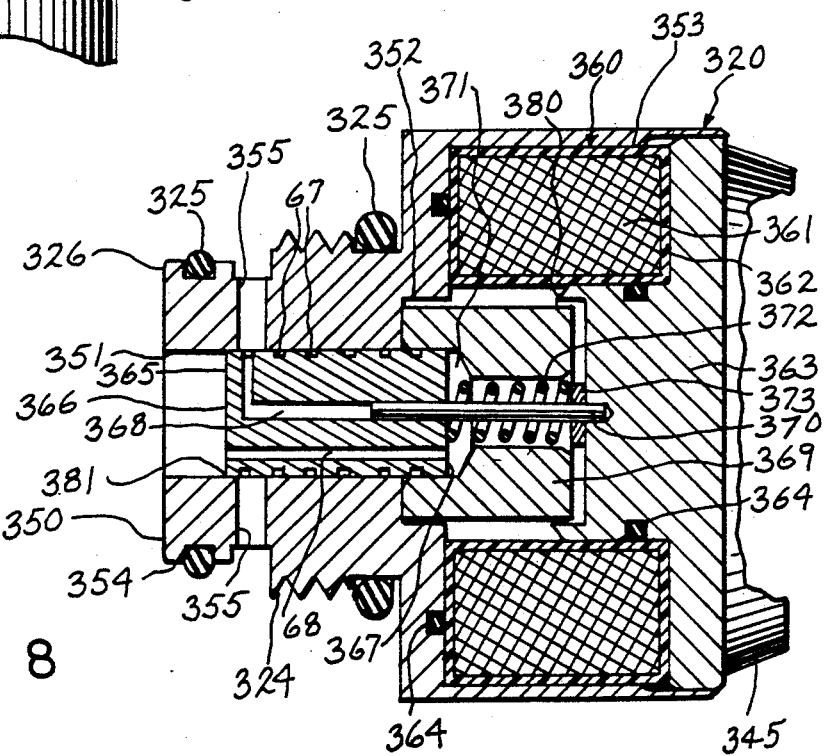
FIG. 8 is an enlarged view partially in section of the proportional pressure control valve as shown in FIG. 7.

With reference also to FIG. 8, the uni-directional, proportional pressure control valve 320 has a housing 350 with a main bore 351, a secondary bore 352 and a driver cavity 353. The main bore 351 extends to the nose 326 of the valve 320, thus providing a path for fluid from the bypass chamber 311 (FIG. 7) to the main bore 351. The housing 350 includes a flanged area 354 and threads 324 for connection to the damper 300. Six cross holes 355 (the number may vary; only two shown) extend radially outward from the main bore 351 through the housing 350. The cross holes 355 provide fluid communication between the equalization chamber 312 (FIG. 7) and the main bore 351 of the valve 320.

A single-direction electromagnetic driver 360 is mounted within the driver cavity 353. The electromagnetic driver 360 includes a coil 361 which is sealed in an annular bobbin 362. Electrical leads (not shown) for the coil 361 extend through a cover 363 and into the electronic valve driver 345 which is in turn connected to a control unit (such as the vehicle ECU). The electronic valve driver 345 may alternatively be incorporated into the ECU 56 (FIG. 3). The cover 363 is crimped but may be welded, threaded or otherwise suitably attached to the housing 350 to seal the driver cavity 353 and enclose the bobbin 362. The cover 363 is formed with an annular projection 380 having a tapered edge. The projection 380 is positioned against the bobbin 362 and adjacent an armature 369 to minimize the flux leakage. Other shapes of projections as commonly known and used in the art may be substituted to produce efficient proportional operation of the electromagnetic driver 360. A pair of O-rings 364 are positioned against the bobbin 362 to minimize the flow of fluid toward the connection between the cover 363 and the housing 350. The electromagnetic driver 360 is energizable to establish a flux path through the armature 369. The preferred method of operation is constant current modulation to the electromagnetic driver 360 by the electronic valve driver 345, using either linear or pulse-width modulated digital signals.

A metering spool 365 having a first face 366 and a second face 367 is slidably positioned within the main bore 351. A pair of axial channels 68 (only one shown) extend longitudinally through the metering spool 365.

The metering spool 365 also includes an L-shaped opening 368 that is generally sealed at one end by a pin 370. The pin 370 is press fitted or otherwise suitably mounted within the cover 363, coaxial with the main bore 351. The metering spool 365 may slide on the pin 370, with fluid possibly leaking from an inner chamber 371 of the valve 320 to the axially extending portion of the L-shaped opening 368. The radially extending portion of the L-shaped opening 368 is aligned with the cross holes 355, and is flared so that the L-shaped opening 368 is in communication with at least one of the cross holes at all times. The metering spool 365 also includes balancing grooves 67 to minimize friction.

The position of the metering spool 365 is determined in part by a spring 372 that extends between a washer 373 and the second face 367 of the metering spool. The pin 370 and the washer 373 are formed of a non-magnetic material for improved electromagnetic efficiency. Axial travel of the metering spool 365 toward the nose 326 is limited to the position shown in FIG. 8, because the armature 369 is press fitted onto the spool 365. The armature 369 is thus biased by the spring 372 against a shoulder formed in the housing 350 between the main bore 351 and the secondary bore 352. The fail-safe position of the armature 369 thus closes the valve.

The valve 320 is operable to channel fluid in one direction: from the bypass chamber 311 to the equalization chamber 312 (see FIG. 7). The position of the metering spool 365 is determined according to the following equation:

$$\Sigma F_{Magnetic} + F_{Feedback} = \Sigma F_{Spring} + F_{Bernoulli} + F_{Friction} \qquad \text{Equation 3}$$

The feedback force is the result of the fluid from the bypass chamber 311 acting on the first and the second faces 366 and 367 of the metering spool 365. The bypass chamber 311 pressure is communicated to the second face 367 due to the axial channels 68. The second face 367 has a smaller surface area than the first face 366 by an amount equal to the cross-sectional area of the pin 370. The net feedback force on the spool 365 is thus equal to the pressure on the first face 366 multiplied by the cross-sectional area of the pin 370. The feedback force tends to move the spool 365 toward the cover 363 against the force of the spring 372. When the metering spool 365 and the armature 369 move in the direction of the cover 363 a sufficient amount, the valve 320 will open and fluid will pass from the main bore 351 to the cross holes 355 and into the equalization chamber 312. The metering spool 365 may assume an infinite number of open positions depending on the distance of a metering edge 381 from the edge of the cross holes 355.

The electromagnetic driver 360 employed in this valve 320 is uni-directional and does not include a permanent magnet. When current is supplied to the coil 361, the flux path tends to move the armature 369 toward the center of the coil. Because the metering spool 365 is connected to the armature 369, energization of the electromagnetic driver 360 also tends to move the spool toward the cover 363. With reference to Equation 3, the magnetic and feedback forces oppose the spring force. Thus, while the spring 372 biases the armature 369 and metering spool 365 away from the cover 363, the electromagnetic driver 360 is energizable to produce a flux path tending to pull the armature toward the cover. The size of the spring 372 will in part determine the amount of feedback and magnetic forces that are required to open the valve 320. It will be apparent that the bi-directional driver as previously described could be substituted for uni-directional driver 360.

A further embodiment of the invention is shown in the uni-directional flow valve 400 of FIG. 9. A housing 401 has a driver cavity 36 containing a bi-directional electromagnetic driver 35 as described in relation to the embodiment of FIG. 2. The housing 401 has a first inlet port 402 in communication with a pressure source P1 and a tank port 403 that is in communication with a low or atmospheric pressure source or Tank T. A metering spool 144 is connected to an armature 40 (not shown in FIG. 9) by a plunger rod 145. Fluid may pass from P1 to the Tank depending on the position of the metering spool 144 and specifically metering edge 69. Fluid will generally not flow in the opposite direction if the minimum operating pressure of P1 is maintained above that of the Tank.

First and second end chambers 146 and 147 communicate with each other and with the tank port 403 via passages 157. Fluid leaking into the end chambers 146 and 147 may thus drain to the Tank. The first and second end chambers 146 and 147 include first and second springs 151 and 178. The first and second springs 151 and 178 establish a fail-safe position for the valve 400 that allows fluid communication from P1 to Tank.

A feedback section 404 has a passage 405 to convey the pressure P1 to a feedback chamber 163 without encountering a shuttle valve. The passage 405 does have a throttle 162 to dampen the fluid flow and prevent limit cycling caused by rapid oscillations of pressure P1. The pressure within the feedback chamber 163 acts on a lateral face 177 of a feedback arm 166 which is slidably positioned within a guide member 165. The feedback arm 166 is maintained in contact with the metering spool 144 by the second spring 178. Radial holes 175 allow fluid in the second end chamber 147 to drain into the passages 157.

The summation of forces acting of the armature/plunger rod/metering spool configuration determines the position of the metering spool during operation of the valve 400. The forces operate in the same manner as described in relation to the bi-directional flow valve 140 of FIG. 4. In the present valve 400, however, the feedback pressure is the result of pressure P1 only.

A further embodiment of the invention having uni-directional fluid flow is a pressure control valve 450 as shown in FIG. 10. A housing 451 for the valve 450 is formed with a driver cavity 36, an intermediate bore 452 and a main bore 63. The main bore 63 terminates in an end wall 453 and has a first port 402 in communication with a pressure source P1 and a tank port 403. A metering spool 455 includes two annular lands 65 that are sized to slidably fit within the main bore 63. An infinite number of open positions for the valve 450 result from the position of metering edge 69. A first recessed area 66 is formed between the lands 65 and a second recessed area 456 extends on the rod end 27 of the metering spool 455. A feedback surface 457 is formed on the face of the land 65 adjacent the second recessed area 456. The second recessed 456 area is slidably positioned within an annular guide member 458. The guide member 458 is positioned in the intermediate bore 452 against a shoulder formed in the housing 451. A snap ring 173 fits into a groove in the housing 451 and holds the guide member 458 in place. An O-ring 174 minimizes fluid communication between a first end chamber 461 and a feedback chamber 462.

A second end chamber 463 contains a spring 464 which is loaded between the end wall 453 and the metering spool 455. The spring 464 forces the metering spool 455 to a fail-safe position as shown in FIG. 6, where the spool prevents fluid communication from P1 to the Tank. The first and second end chambers 461 and 463 are in fluid communication with each other and with the Tank through passages 157. Fluid leaking into the end chambers 461 and 463 past the metering spool 455 or the guide member 458 may drain to the Tank.

A feedback section 465 having a passage 405 with a throttle 162 conveys the pressure P1 to the feedback chamber 462. The pressure from P1 within the feedback chamber 462 acts on the feedback surface 457 and tends to move the metering spool 455 toward the base end 28 of the valve 450. The feedback force thus tends to position the metering spool 455 to open flow from P1 to the Tank. The operating position of the metering spool 455 will be the position that balances the forces acting on the spool. The spring 464 will exert a force tending to resist movement of the metering spool 455 toward the base end 28. The electromagnetic driver 35 is bi-directional depending on the polarity of current supplied, and therefore may tend to move the metering spool 455 in either direction. The friction and Bernoulli forces act in the same manner as previously described.

Figure 11:
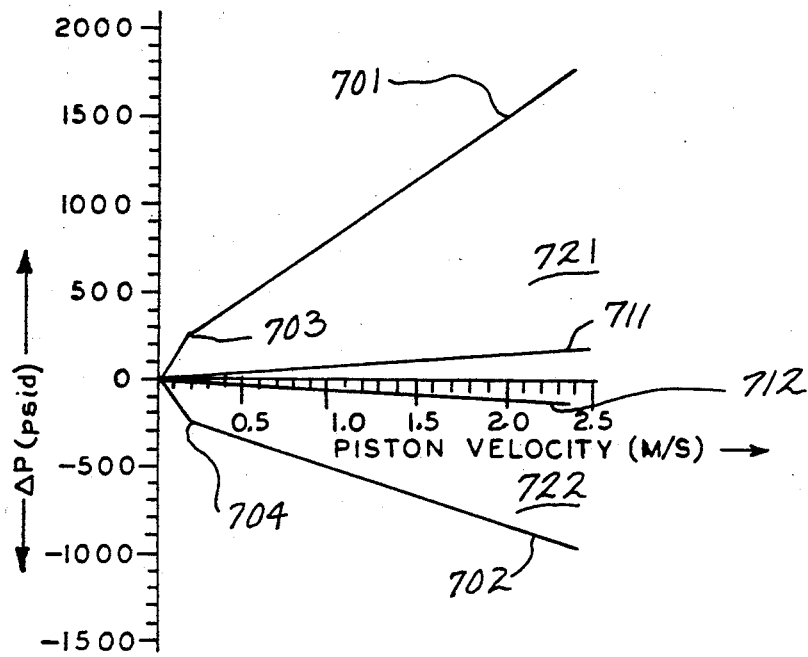
FIG. 11 is a graph showing the relationship between changes in pressure and piston velocity for the embodiment of the invention shown in FIG. 2.

The graph of FIG. 11 shows the operating characteristics of a damper 20 (FIG. 1) that incorporates the bi-directional valve 25 shown in FIG. 2. The abscissa represents the velocity of the damper piston 21 measured in meters per second. The ordinate represents the change in pressure over the valve 25, or $\Delta P = P1 - P2$. A positive $\Delta P$ indicates the vehicle suspension is in extension, while a negative $\Delta P$ indicates the vehicle suspension is in compression.

Curves 701 and 702 plot the operating characteristics of the damper 20 when the metering spool 64 of the valve 25 is continuously positioned to prevent fluid communication between P1 and P2 through the valve. This is achieved in the valve of FIG. 2 by generating sufficient electromagnetic force to counteract the feedback force and to move the spool 64 toward the base end 28 to prevent flow between P1 and P2. The characteristics of the curves 701 and 702 are thus determined by the design of the known damping valves 24 within the damper 20. The abrupt changes in the curves at 703 and 704 indicate that additional valving such as a relief valve begins to provide fluid communication at those pressures. Also, the piston 21 velocity associated with a given pressure is greater for curve 702 than for curve 701 because dampers are generally designed to provide a stiffer ride during extension.

Curves 711 and 712 of FIG. 11 plot the operating characteristics of the damper 20 when the metering spool 64 is continuously positioned to provide maximum fluid flow between P1 and P2 through the valve 25. This is achieved by allowing the feedback pressure to move the metering spool 64 toward the rod end to provide maximum fluid flow, or by supplying sufficient current to the coils 51 in the correct polarity to create an electromagnetic force which will combine with the feedback force to move the spool 64 toward the rod end 27. Compared to the damper operation when the valve 25 is closed, the piston velocity is much greater at lower pressure differences when the valve 25 is fully open. In fact, with the valve 25 fully open, the pressure difference will not reach the level (associated with points 703 and 704) required to initiate fluid flow through the additional valving of the damper 20, such as the relief valves.

Because the electromagnetic driver 35 is proportionally controlled, the valve 25 may be operated anywhere between the fully closed and fully open positions. Thus, the damper 20 may be operated anywhere within space 721 or space 722. Space 721 includes every operating point between curves 701 and 711, and space 722 includes every operating point between curves 702 and 712. The desirability of operating the damper 20 at different locations within the spaces 711 and 722, i.e., different ride modes, is believed to be a function of numerous variables associated with the vehicle's operating conditions, such as speed, load, and suspension position. Once the desired ride mode for a given set of variables is determined, the ECU 56 can be programmed to receive inputs related to those variables and generate an appropriate current to the electromagnetic driver to achieve the desired ride mode.

Figure 12:
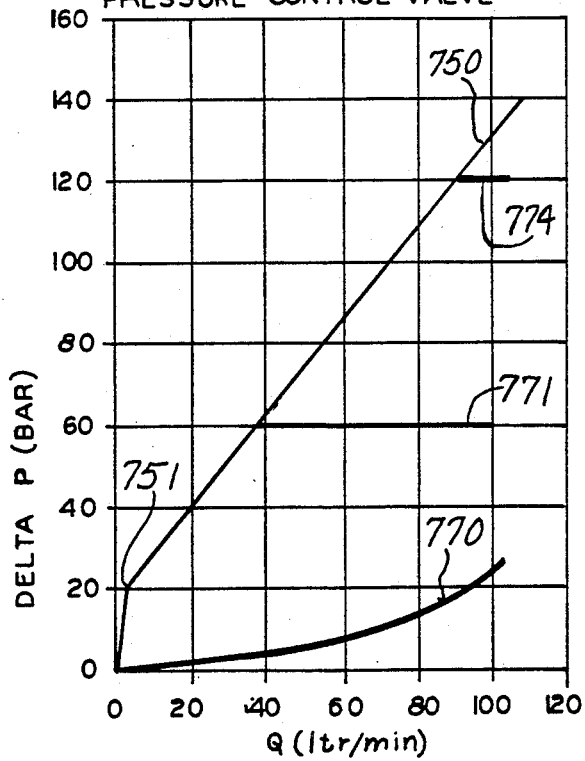
FIG. 12 is a graph showing the relationship between changes in pressure and fluid flow at varying current levels for the embodiment of the invention shown in FIG. 2.

The operating characteristics of the damper 20 incorporating the bidirectional valve 25 of FIG. 2 are also shown in FIG. 12. In this graph, operating curves are show for several different levels of current supplied to the coils 51 of the electromagnetic driver 35. The abscissa represents the quantity of flow between P1 and P2, expressed in liters per minute. The ordinate represents the change in pressure over the valve 25, measured in bar. Curve 750 shows the operating characteristics of the damper 20 when the metering spool 64 is held continuously closed. At point 751, the curve 750 changes slope indicating that known damping valves 24 within the damper 20 open at approximately twenty bar.

Curve 774 represents the operating characteristics of the damper 20 when a four ampere current is continually supplied to the coils 51. The fourampere curve 774 tracks the valve-closed curve 750 between zero and approximately 120 bar because the current moves the metering spool 64 toward the base end 28. After reaching pressure differences greater than 120 bar, the feedback pressure is sufficient to overcome the magnetic force and other forces tending to keep the valve 25 closed. At that point, the metering spool 64 moves toward the rod end 27 a sufficient distance to permit fluid communication between the pressure ports P1 and P2.

When a constant current of one ampere is supplied to the coils 51, the damper 20 operates according to curve 771. The one-ampere curve 771 tracks the valve-closed curve 750 between zero and approximately sixty bar. This input current maintains the metering spool 64 in the closed position until the feedback pressure is sufficient to open communication. The quantity of flow may then increase to approximately 100 liters per minute without a pressure increase across the valve 25.

Curve 770 represents the operating curve of the damper 20 when no current is supplied to the valve 25. Due to the initial positioning of the metering spool 64 in relation to the centered position of the armature 40, the valve 25 is initially open. As pressure across the valve increases, the feedback pressure forces the metering spool 64 toward the rod end 27 to more fully open the valve 25. After approximately 50 liters per minute, the slope of the curve 770 becomes more steep. This is due to the large quantity of fluid that is passing through the valve 25. The passages within the valve 25 begin to restrict increased flow through the valve and cause a rise in the pressure difference across the valve.

Figure 13:
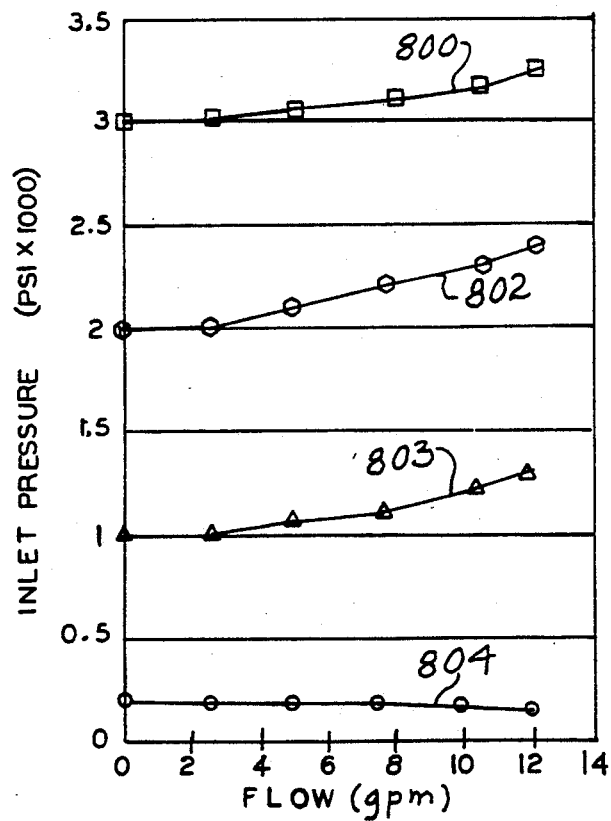
FIG. 13 is a graph showing the relationship between inlet pressure and fluid flow at varying current levels for the embodiment of the invention shown in FIG. 8.

FIG. 13 is a graph depicting typical operation of the uni-directional pressure control valve 320 of FIGS. 7 and 8 at different levels of input current. In the graph, the abscissa represents the fluid flow through the valve 320 measured in gallons per minute. The ordinate represents the inlet pressure, i.e. the pressure at the nose 326 of the valve 320, measured in thousands of pounds per square inch. The points shown on the graph represent estimated operating characteristics, and the curves are positioned to approximate continuous operation at a specific level of current.

When no current is supplied to the coil 361 of the electromagnetic driver 360, the spring 272 causes the metering spool 365 to assume a position which prevents fluid flow through the valve 320. Fluid will flow through the valve 320 only when the inlet pressure creates a feedback force that moves the spool 365 toward the cover 363 a sufficient distance to open flow. Curve 800 represents the operation of the valve 320 when no current is supplied to the coil 361 and indicates that an inlet pressure of approximately 3000 psi is required to open the valve. The opening pressure is a function of the size of the spring 372 and the cross-sectional area of the pin 370. When the pressure is sufficient to open the valve 320, fluid will flow through the valve and thereby tend to reduce the inlet pressure and create a Bernoulli force tending to close the valve. This causes the metering spool 365 to modulate between open and closed positions at a particular pressure, such as 3000 psi when no current is supplied to the coil 361. For increased levels of flow through the valve, the inlet pressure must rise above 3000 psi to produce a feedback force equal to the combined spring, Bernoulli and friction forces and position the metering spool 365 in the open position. In the preferred mode of operating the valve 320, the inlet pressure modulates about a desired level while the flow through the valve is maintained under approximately five gallons per minute.

Curve 802 represents the operating characteristics of the valve 320 when a two-ampere current is supplied to the coil 361. The current moves the armature 369 and the metering spool 365 toward the cover 363, but not a distance sufficient by itself to open fluid flow. Rather, an inlet pressure of approximately 2000 psi is required to create a feedback force which will combine with the magnetic force to move the spool 365 to open fluid flow. If the two-ampere input is maintained, the metering spool 365 will modulate between open and closed positions and maintain the inlet pressure at approximately 2000 psi.

As represented by curve 803, the valve 320 operates in a similar manner when a three-ampere current is supplied to the coil 361. The increase in current to three amperes causes a proportional increase in the magnetic force tending to open the valve 320. In this case, an inlet pressure of approximately 1000 psi will be sufficient to open the valve 320.

Curve 804 shows the operating characteristics of the valve 320 when a four-ampere current is supplied to the coil 361. This current moves the armature 369 and metering spool 365 toward the cover 363 a sufficient distance to permit flow between the bypass chamber 311 and the equalization chamber 312. The inlet pressure of approximately 200 psi is the minimum operating pressure desirable in the multi-tube damper 300 for a soft ride.

Figure 14:
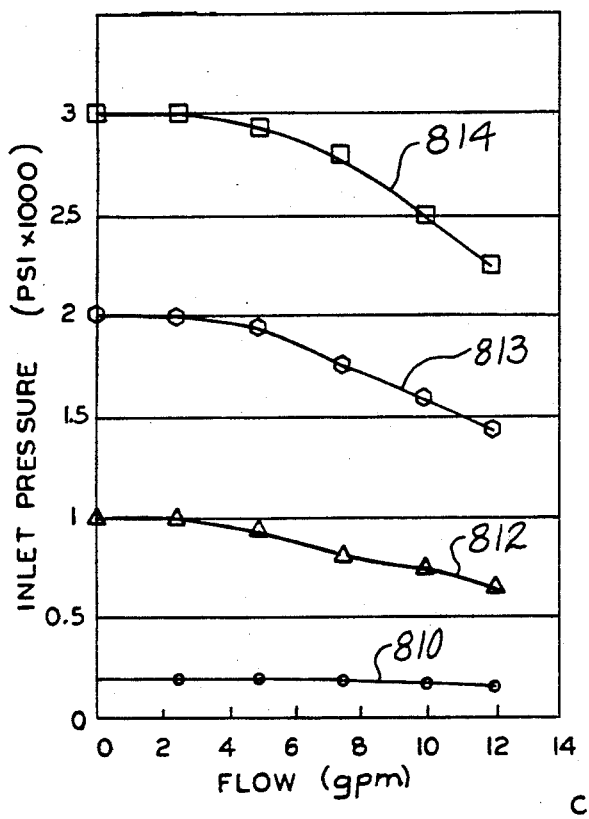
FIG. 14 is a graph similar to FIG. 13 but relating instead to the embodiment of the invention shown in FIG. 9.

The graph of FIG. 14 is similar to that of FIG. 13, although it shows the operating characteristics of the multi-tube damper 300 when the damper incorporates the uni-directional valve 400 shown in FIG. 9. Curve 810 represents the operating characteristics of the valve 400 when no current is supplied to the coils 51. The fail-safe position of the valve 400 including springs 151 and 178 is such that fluid may flow from P1 (bypass chamber 311) to the Tank (equalization chamber 312) when no current is supplied to the electromagnetic driver 35. As mentioned in regard to FIG. 13, the damper 300 is preferably operated with a minimum operating pressure of approximately 200 psi.

Curve 812 represents the operating characteristics of the valve 400 when a two-ampere current is supplied to the coils 51. The polarity of the current is such that the metering spool 144 is moved toward the base end 28 to prevent fluid flow between P1 and the Tank. The graph shows that no fluid will flow through the valve 400 until P1 reaches approximately 1000 psi. At that pressure, the feedback force is sufficient to overcome the magnetic and other forces tending to close the valve 400. Fluid will flow through the valve 400, causing the inlet pressure to drop. In contrast to the graph of FIG. 13, it is contemplated for this valve 400 that the inlet pressure will decay as flow through the valve and the corresponding Bernoulli force increase. If the two-ampere input is maintained, the metering spool 365 will modulate back and forth causing the inlet pressure to remain at approximately 2000 psi.

Likewise, curves 813 and 814 represent the operating characteristics of the valve 400 when currents of three and four amperes, respectively, are supplied to the coils 51. When a three-ampere current is supplied, an inlet pressure of approximately 2000 psi is required to open the valve 400. With a four-ampere current, a 3000 psi inlet pressure is required to open the valve 400. In this valve 400, the preferred mode of operation is for the inlet pressure to modulate about a desired level while flow through the valve is maintained under approximately five gallons per minute.

Figure 15:
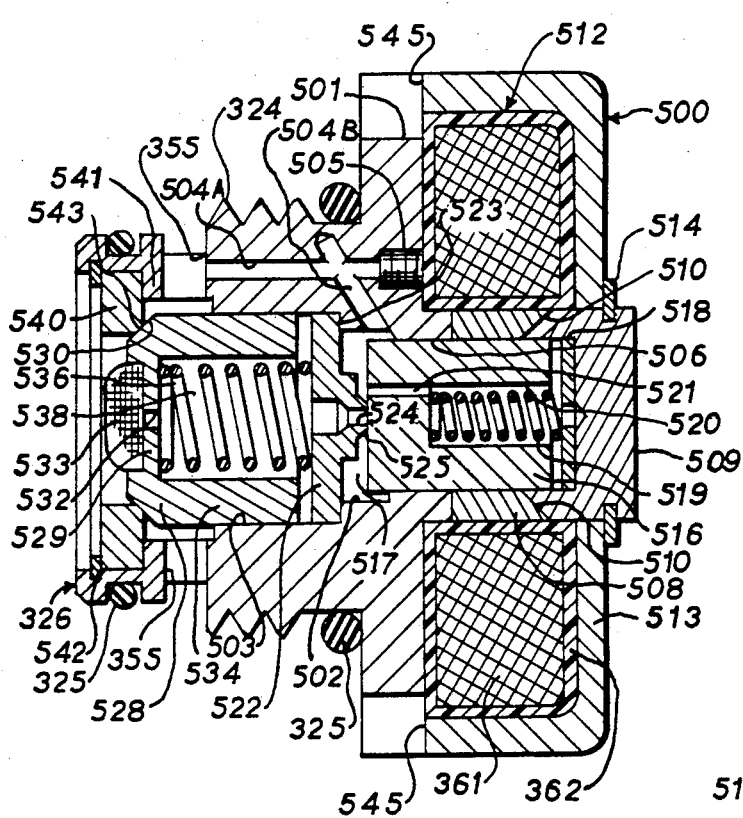
FIG. 15 is a view in section showing an eighth embodiment of the invention.

Referring now to FIG. 15, a two-stage, proportional valve 500 for unidirectional flow control is shown. The valve 500 is designed to be mounted in the multi-tube damper 300 (FIG. 7) in the same manner as valve 320 (FIGS. 7 and 8) was mounted. The valve 500 regulates the flow of fluid uni-directionally from the bypass chamber 311 to the equalization chamber 312. The valve 500 includes external threads 324 which engage internal mating threads on the guide 321. With the nose 326 of the valve 500 pressed against the receiving bracket 327, the O-rings 325 prevent fluid leakage between the guide 321 and the valve 500 and between the bypass chamber 311 and the equalization chamber 312. By connecting the valve 500 in this manner, fluid from the bypass chamber 311 is in communication with the nose 326 of the valve.

The proportional pressure control valve 500 has a housing or body 501 formed of a ferromagnetic material such as iron with a stepped central bore 502. The body 501 includes cross holes 355 which provide fluid communication between a poppet bore portion 503 of the central bore 502 and the equalization chamber 312 (FIG. 7). The valve body 501 also includes at least one set of conduits 504A and 504B which connect the cross holes 355 to an armature bore portion 506 of the central bore 502. Conduit 504A is sealed by a lee plug 505. The central bore 502 is open at the nose 326 and is sealed at the armature bore portion 506, which has a reduced diameter, by a cylindrical sleeve 508 and a disc-shaped solenoid cap 509. The sleeve 508, formed of a non-magnetic material such as stainless steel, and the solenoid cap 509, formed of a ferromagnetic material, are welded or otherwise suitably fastened in place. The sleeve 508 and solenoid cap 509 have sloped mating surfaces 510.

A single-direction electromagnetic driver 512 is positioned around the sleeve 508 and against the body 501. A cover 513 for the electromagnetic driver 512 is secured against the body 501 by a retaining ring 514 lodged in a groove in the solenoid cap 509. An annular bobbin 362 containing a coil 361 is held captive between the body 501 and the cover 513. Electrical leads (not shown) are routed through the bobbin 362 and the cover 513 to connect the electromagnetic driver 512 to an electronic valve driver (such as 345 in FIGS. 7 and 8) and the ECU of the vehicle. This electromagnetic driver 512 and cover 513 arrangement allows for replacement or maintenance of the electromagnetic driver 512 without breaking the fluid seal of the valve 500.

An armature 516 is positioned in the armature bore portion 506 of the central bore 502, inward of portions of the body 501, the sleeve 508 and the solenoid cap 509. The armature 516, which is a component of the electromagnetic driver 512, is generally cylindrical and preferably formed of a low magnetic reluctance, ferromagnetic material. A central spring chamber 520 of the armature 516 is in communication with an off-center, longitudinally-extending channel 521. The armature 516 is sized to have a slight radial clearance inside the bore 506. When assembling the valve 500, a spacer disc 518 preferably formed of non-magnetic stainless steel is placed between the armature 516 and the solenoid cap 509. An armature spring 519 is loaded between the spacer disc 518 and the armature 516.

An orifice plate 522 is press fitted or otherwise suitably secured within the body 501 against a step 523. A flow chamber 517 is defined within the central bore 502 between the orifice plate 522 and the armature 516. A longitudinal passage 524 passes through a raised central portion of the orifice plate 522. The raised portion extends in the direction of the solenoid cap 509 and forms a valve seat 525 for the armature 516.

A poppet 528 is formed with a main surface 529 surrounded by a tapered edge 530. An aperture 532 passes through the main surface 529. A screen 533 is secured by press fitting or other suitable means to the main surface 529. A skirt portion 534 of the poppet 528 extends axially from the tapered edge 530. The skirt portion 534 is sized to fit within the poppet bore portion 503 of the stepped central bore 502. The poppet 528 is slidably positioned in the bore 503 with the skirt portion 534 extending toward the orifice plate 522 and a poppet spring 536 loaded between the poppet 528 and the orifice plate 522. A control pressure chamber 538 is thus formed between the poppet 528 and the orifice plate 522.

The poppet 528 is maintained within the valve 500 by a seat member 540. The seat member 540 is secured against a shoulder 541 of the body 501 by a retaining ring 542. The seat member 540 may have a tapered interior edge forming a valve seat 543 for the poppet 528. Alternatively, the seat member 540 could be integrally formed as part of the valve body 501.

The proportionally operated valve 500 is installed by rotatably engaging the threads 324 of the body 501 with the internal threads of the cylindrical guide 321 (FIG. 7). Wrench openings 545 are formed in the body 501 to assist in assembly. The nose 326 inserts into the receiving bracket 327 and one of the O-rings 325 prevents fluid communication between the bypass chamber 311 and the equalization chamber 312, other than through the valve 500.

With the valve 500 installed in the damper 300, fluid may flow through the valve from the bypass chamber 311 to the equalization chamber 312, depending on the position of the poppet 528. The poppet spring 536 normally biases the poppet 528 to a closed position (FIG. 15) where the tapered edge 530 of the poppet is in contact with the valve seat 543 of the seat member 540. The tapered surfaces of the edge 530 and the valve seat 543 assist in establishing a proper seal.

In the closed position, fluid from the bypass chamber 311 is in communication with the nose 326 of the valve 500. The fluid passes through the screen 533 which prevents contaminants from entering the valve 500. The fluid is channeled into the control pressure chamber 538 via aperture 532. When no current is supplied to the electromagnetic driver 512, the armature 516 is biased by armature spring 519 onto the valve seat 525 of the orifice plate 522. As a result, fluid is trapped in the control pressure chamber 538 and the control pressure (i.e., the pressure in the control pressure chamber 538) approximates the fluid pressure in the bypass chamber 311 (at the nose 326 of the valve 500). With equal pressures acting on opposite sides of the main surface 529, the poppet 528 is forced against the valve seat 543 due to the control pressure acting on a larger surface area of the poppet. Thus, there is normally no fluid flow through the valve 500 when the electromagnetic driver 512 is not activated. This closed fail-safe condition of the valve 500 means that the shock absorber 300 will provide high damping when current to the electromagnetic driver 512 is interrupted.

Fluid flow through the valve 500 may be variably controlled by activation of the electromagnetic driver 512. Upon energization of the single direction electromagnetic driver 512, a magnetic flux path is established through portions of the body 501, the armature 516, the solenoid cap 509 and the cover 513. The preferred method of operation is constant current modulation to the electromagnetic driver 512 by the electronic valve driver 345 (FIGS. 7 and 8; which in this instance is connected to the vehicle ECU), using either linear or pulse-width modulated digital signals. The resulting electromagnetic force causes the armature 516 to move off the valve seat 525 in the direction of the solenoid cap 509, against the force of the armature spring 519. Because the magnitude of the current determines the strength of the flux path, the amount of force tending to move the armature 516 off the valve seat 525 is substantially proportional to the magnitude of the input current. The annular sloped surface 510 of the solenoid cap 509 is used to improve the operating characteristics of the valve 500, although other shaped projections as commonly known and used in the art may be substituted to achieve efficient proportional operation of the electromagnetic driver 512. As the armature moves toward the solenoid cap 509, fluid in the spring chamber 520 may drain through channel 521 and conduits 504A and 504B to the equalization chamber 312. Note that the nonmagnetic stainless steel spacer disc 518 prevents the armature 516 from latching against the solenoid cap 509 as a result of residual magnetism.

As the armature 516 moves off the valve seat 525, fluid from the control pressure chamber 538 escapes to chamber 517 through passage 524 and through an orifice area formed between the armature 516 and the valve seat 525. This fluid drains through conduits 504A and 504B and cross holes 355 into the relatively lower pressure equalization chamber 312. Fluid flow through aperture 532 and then through the orifice area between the armature 516 and the valve seat 525 causes the control pressure in chamber 538 to drop below that of the fluid pressure in the bypass chamber 311. A differential pressure force develops which, when sufficient to overcome the force of the poppet spring 536, causes the poppet 528 to move off the valve seat 543. Fluid then flows between the poppet 528 and the seat member 540 and into the equalization chamber 312 through the cross holes 355.

The proportionally-operated valve 500 is capable of establishing a wide range of fluid flow rates. The electromagnetic force acting on the armature 516 is proportional to the level of current supplied to the electromagnetic driver 512. The distance that the armature 516 is off the valve seat 525 determines in part the rate at which the pressure drops in the control pressure chamber 538. The pressure differential across the poppet 528 affects the position of the poppet 528 and the amount of flow through the valve 500. The fluid flow through the valve 500 is thus directly related to the level of input current supplied to the electromagnetic driver 512. Because the electromagnetic driver 512 is proportionally controlled, the valve 500 may be operated anywhere between the closed and fully open positions.

As previously noted, the valve 500 is normally closed when the electromagnetic driver 512 is deactivated. The size of the armature spring 519 may be adjusted, however, so that a sufficiently large control pressure will unseat the armature 516. In this instance, when the control pressure multiplied by the cross sectional area of the passage 524 is greater than the force of the armature spring 519, the armature 516 will leave the valve seat 525. Conversely, the size of the armature spring 519 may be set so that the valve 500 remains closed over the expected range of control pressures, when the electromagnetic driver 512 is de-energized.

The valve 500 will remain closed to fluid flow when the pressure in the equalization chamber 312 becomes greater than that in the balancing chamber 311. Fluid from the equalization chamber 312 may enter the cross bores 355 and chamber 517, but it will not generally open the valve 500. When the electromagnetic driver 512 is de-energized, the poppet spring 536 prevents the poppet 528 from leaving the valve seat 543. If the electromagnetic driver 512 is energized, fluid from the equalization chamber 312 flows through the passage 524 into the control pressure chamber 538 and causes the poppet 528 to seat against the valve seat 543. Only a minimal amount of pilot flow will leak through aperture 532 in this situation. Thus, the valve 500 is advantageously closed to fluid flow from the equalization chamber 312 to the balancing chamber 311 when the equalization chamber 312 is at a higher pressure.

Figure 16:
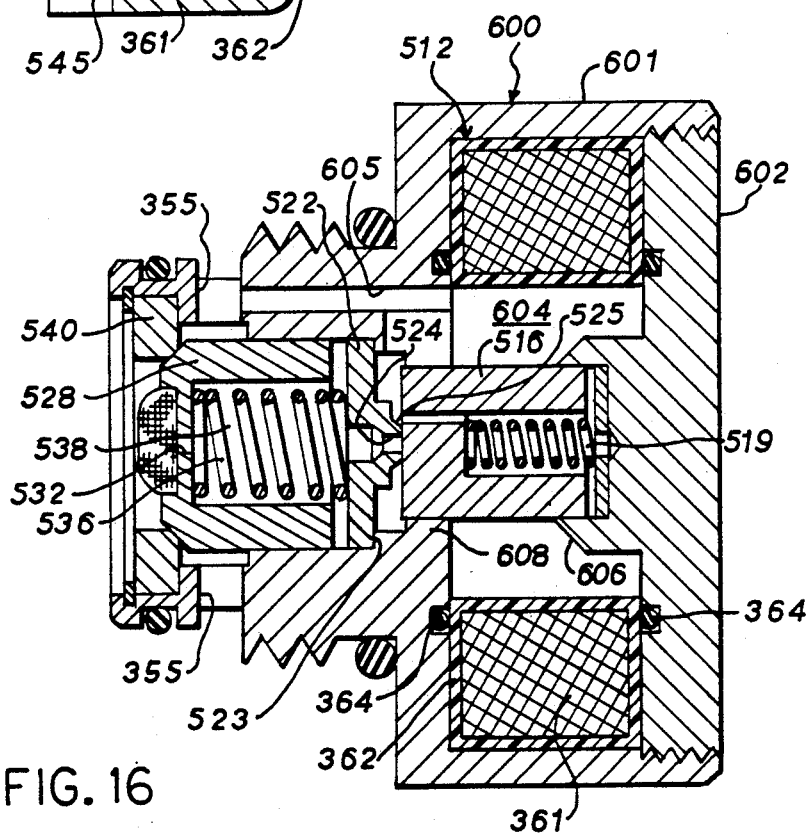
FIG. 16 is a view in section showing a ninth embodiment of the invention.

An alternate embodiment of the proportionally-controlled, two-stage structure is shown in the uni-directional valve 600 of FIG. 16. This valve 600 includes a body 601 that threadably receives a cover 602. The annular bobbin 362 and coil 361 are trapped between the body 601 and the cover 602. A pair of O-ring seals 364 are positioned against the bobbin 362 to prevent the flow of fluid toward the connection between the cover 602 and the body 601.

An armature chamber 604 is formed radially inward of the bobbin 362 between the cover 602 and the orifice plate 522. The armature chamber 604 is in fluid communication with the cross holes 355 (and thus the equalization chamber 312 when connected to the damper 300 of FIG. 7) through conduit 605. The armature 516 is positioned in the armature chamber 604 and is maintained in position by an annular tapered projection 606 of the cover 602 and an inwardly-extending flange 608 of the body 601. The tapered projection 606 is used to improve the operating characteristics of the valve 600, although other shaped projections as commonly known and used in the art may be substituted to achieve efficient proportional operation of the electromagnetic driver 512.

In all other respects, the structure and operation of the valve 600 is the same as that specified for valve 500 of FIG. 15. The valve 600 is normally closed to fluid flow because the poppet spring 536 causes the poppet 528 to seat against the seat member 540. Energization of the electromagnetic driver 512 creates a force which overcomes the force of the armature spring 519 and causes the armature 516 leave the valve seat 525. Fluid may then exit the control pressure chamber 538 through the passage 524 and through an orifice area formed between the armature 516 and the valve seat 525. The resulting pressure drop in the control pressure chamber 538 causes the poppet 528 to move toward the orifice plate 522 and open the valve 600 to fluid flow between the poppet 528 and the seat member 540. Unless the armature spring 519 is light enough to permit the armature 516 to be unseated by the control pressure acting in the passage 524, the valve 600 will be closed to fluid flow whenever the electromagnetic driver 512 is de-energized.

The foregoing detailed description has been for the purpose of illustration. Thus, a number of modifications and changes may be made without departing from the spirit and scope of the present invention. For example, a bidirectional driver could be substituted for uni-directional driver 512 used in valve 500. Likewise, the type, position and setting of the springs could be changed to produce different forces on the armature 516 and poppet 528. Therefore, the invention should not be limited by the specific embodiments described, but only by the claims.

We claim:

1. A proportional pressure control valve, comprising:
   a body having:
      a poppet bore;
      an annular seat adjacent to one end of said poppet bore;
      an armature bore adjacent to the other end of said poppet bore;
      inlet and outlet ports in communication with the poppet bore, said inlet port being upstream of said annular seat and said outlet port being downstream of said annular seat; and
      a conduit connecting the armature bore and the outlet port;
   an orifice plate separating the poppet and armature bores, the orifice plate having a passage therethrough;
   an electromagnetic driver having;
      an armature movable within the armature bore between a closed position, where the armature contacts the orifice plate and blocks fluid flow through the passage, and an infinite number of flow positions, where the armature is spaced apart from the orifice plate to permit variable fluid flow through the passage;

an electromagnetic force source associated with the armature, the electromagnetic force source being operable to receive a variable input current and to establish a magnetic flux path through the armature to move the same, the strength of the magnetic flux path being substantially proportional to the variable input current;

a poppet having a main surface and an aperture extending through the main surface, the poppet being positioned within the poppet bore and movable in an infinitely variable manner between a sealing position against said annular seat and an infinite number of open positions, the position of the poppet in the open positions determining in part the magnitude of fluid flow between the inlet and outlet ports;

means for biasing the armature within the armature bore; and means for biasing the poppet within the poppet bore.

2. The proportional pressure control valve of claim 1, wherein:
the armature is biased toward the closed position; and
the electromagnetic force source is operable to move the armature into a flow position.

3. The proportional pressure control valve of claim 2, wherein:
a control pressure chamber is formed between the poppet and the orifice plate;
a flow chamber is formed adjacent the armature; and
the control pressure chamber is in communication with the flow chamber when the armature is in a flow position.

4. A proportional pressure control valve, comprising:
a body having:
a poppet bore;
an armature bore;
inlet and outlet ports in communication with the poppet bore; and
a conduit connecting the armature bore and the outlet port;
an orifice plate separating the poppet and armature bores, the orifice plate having a passage therethrough;
an electromagnetic driver having:
an armature movable within the armature bore between a closed position, where the armature contacts the orifice plate and blocks fluid flow through the passage, and an infinite number of flow positions, where the armature is spaced apart from the orifice plate to permit variable fluid flow through the passage; and an electromagnetic force source associated with the armature, the electromagnetic force source being operable to receive a variable input current and to establish a magnetic flux path through the armature to move the same, the strength of the magnetic flux path being substantially proportional to the variable input current;

a poppet having a main surface and an aperture extending through the main surface, the poppet being positioned within the poppet bore and movable in an infinitely variable manner between a sealing position and an infinite number of open positions, the position of the poppet in the open positions determining in part the magnitude of fluid flow between the inlet and outlet ports;

means for biasing the armature within the armature bore; and means for biasing the poppet within the poppet bore; wherein:
the armature is biased toward the closed position;
the electromagnetic force source is operable to move the armature into a flow position;
a control pressure chamber is formed between the poppet and the orifice plate;
a flow chamber is formed adjacent the armature;
the control pressure chamber is in communication with the flow chamber when the armature is in a flow position; and further comprising
an annular seat member secured to the body, the seat member forming a valve seat for the poppet.

5. The proportional pressure control valve of claim 4, wherein the poppet is biased toward the sealing position where the poppet is in contact with the valve seat.

6. The proportional pressure control valve of claim 5, further comprising:
a sleeve formed of a non-magnetic material and secured to the body;
a solenoid cap secured to the sleeve, the armature movably positioned inward of the sleeve and the solenoid cap.

7. The proportional pressure control valve of claim 6, wherein the electromagnetic force source is located radially outward of the sleeve.

* * * * *

UNITED STATES PATENT AND TRADEMARK OFFICE
CERTIFICATE OF CORRECTION

PATENT NO.  :  5,069,420
DATED       :  December 3, 1991
INVENTOR(S) :  Thomas J. Stobbs and Kishor J. Patel It is certified that error appears in the above-identified patent and that said Letters Patent is hereby corrected as shown below:

Col. 1 before FIELD OF THE INVENTION, insert a new paragraph, --This is a continuation-in-part of U.S. Patent Application Serial No. 07/477,026 filed February 8, 1990.--

Col. 22, line 65, change "lee plug 505" to --plug 505--.

Signed and Sealed this

Fourteenth Day of June, 1994

Attest:

BRUCE LEHMAN

Attesting Officer

Commissioner of Patents and Trademarks